United States Patent
Luo et al.

(10) Patent No.: US 9,900,029 B2
(45) Date of Patent: Feb. 20, 2018

(54) INTRA-FREQUENCY AND INTER-RAT RECEIVER

(71) Applicant: QUALCOMM Incorporated, San Diego, CA (US)

(72) Inventors: Tao Luo, San Diego, CA (US); Srinivas Yerramalli, San Diego, CA (US); Durga Prasad Malladi, San Diego, CA (US)

(*) Notice: Subject to any disclaimer, the term of this patent is extended or adjusted under 35 U.S.C. 154(b) by 466 days.

(21) Appl. No.: 14/453,428

(22) Filed: Aug. 6, 2014

(65) Prior Publication Data
US 2015/0043687 A1 Feb. 12, 2015

Related U.S. Application Data

(60) Provisional application No. 61/863,192, filed on Aug. 7, 2013.

(51) Int. Cl.
*H04B 1/00* (2006.01)
*H04B 1/12* (2006.01)
(Continued)

(52) U.S. Cl.
CPC .............. *H04B 1/006* (2013.01); *H04B 1/12* (2013.01); *H04B 1/7107* (2013.01); *H04J 11/004* (2013.01)

(58) Field of Classification Search
CPC ........ H04B 1/006; H04B 1/7107; H04B 1/12; H04J 11/004
See application file for complete search history.

(56) References Cited

U.S. PATENT DOCUMENTS 7,720,185 B2 5/2010 Vrcelj et al.
8,199,856 B2 6/2012 Belogolovy et al.
(Continued)

FOREIGN PATENT DOCUMENTS

CN 1951022 A 4/2007
CN 101049037 A 10/2007
(Continued)

OTHER PUBLICATIONS

ISA/EPO, International Search Report and Written Opinion of the International Searching Authority, Int'l. App. No. PCT/US2014/050160, dated Mar. 5, 2015, European Patent Office, Rijswijk, NL, 17 pgs.
(Continued)

*Primary Examiner* — Charles C Jiang
*Assistant Examiner* — Kyaw Z Soe
(74) *Attorney, Agent, or Firm* — Holland & Hart LLP

(57) ABSTRACT

Techniques are described for wireless communications. In one example, multiple signals including at least a wireless local area network (WLAN) signal and a cellular signal may be received over a bandwidth of an unlicensed radio frequency spectrum band. Digital samples of the signals may be stored in a buffer. At least a portion of the WLAN signal may be reconstructed from the stored digital samples and removed from the stored digital samples before the contents of the buffer are converted to the frequency domain for demodulation and decoding of the cellular signal by a cellular receiver. In another example, multiple signals may be received over a bandwidth of an unlicensed radio frequency spectrum band, and it may be determined whether to apply codeword-level interference cancelation (CWIC) or symbol-level interference cancelation (SLIC) to remove an interference signal in the multiple signals.

22 Claims, 19 Drawing Sheets

(51) Int. Cl.
*H04B 1/7107* (2011.01)
*H04J 11/00* (2006.01)

(56) References Cited

U.S. PATENT DOCUMENTS

| | | | |
|---|---|---|---|
| 8,391,429 B2 | 3/2013 | Mergen et al. | |
| 8,711,994 B2 | 4/2014 | Mergen et al. | |
| 2005/0266808 A1* | 12/2005 | Reunamaki | H04B 1/005 455/101 |
| 2007/0040704 A1* | 2/2007 | Smee | H04B 1/7107 340/981 |
| 2007/0149242 A1* | 6/2007 | Kim | H04J 11/004 455/525 |
| 2008/0273552 A1* | 11/2008 | Kim | H04B 1/005 370/468 |
| 2010/0265861 A1* | 10/2010 | He | H04L 47/14 370/311 |
| 2012/0189083 A1* | 7/2012 | Reial | H04B 1/123 375/340 |
| 2012/0214524 A1 | 8/2012 | Wajcer et al. | |
| 2013/0044697 A1* | 2/2013 | Yoo | H04W 72/082 370/329 |
| 2013/0044791 A1 | 2/2013 | Rimini et al. | |
| 2013/0107912 A1* | 5/2013 | Ponnampalam | H04L 27/0008 375/147 |
| 2013/0114437 A1* | 5/2013 | Yoo | H04J 11/005 370/252 |
| 2013/0115987 A1* | 5/2013 | Yoo | H04J 11/0056 455/501 |
| 2013/0128778 A1* | 5/2013 | Bennett | H04W 36/08 370/277 |
| 2013/0196701 A1* | 8/2013 | Tiirola | H04J 11/0026 455/501 |
| 2014/0050203 A1* | 2/2014 | Doppler | H04W 16/14 370/336 |
| 2014/0307569 A1* | 10/2014 | Barbieri | H04L 5/0032 370/252 |
| 2014/0378157 A1* | 12/2014 | Wei | H04W 16/14 455/454 |

FOREIGN PATENT DOCUMENTS

| | | |
|---|---|---|
| WO | WO-2005119924 A1 | 12/2005 |
| WO | WO-2006030056 A1 | 3/2006 |
| WO | WO-2013067253 A1 | 5/2013 |

OTHER PUBLICATIONS

ISA/EPO, Partial International Search Report of the International Searching Authority, Int'l. App. No. PCT/US2014/050160, dated Nov. 27, 2014, European Patent Office, Rijswijk, NL, 5 pgs.

* cited by examiner

INTRA-FREQUENCY AND INTER-RAT RECEIVER

CROSS REFERENCES

The present application for patent claims priority to U.S. Provisional Patent Application No. 61/863,192 by Luo et al., entitled "Intra-Frequency and Inter-RAT Receiver," filed Aug. 7, 2013, assigned to the assignee hereof, and expressly incorporated by reference herein.

BACKGROUND

Wireless communications networks are widely deployed to provide various communication services such as voice, video, packet data, messaging, broadcast, and the like. These wireless networks may be multiple-access networks capable of supporting multiple users by sharing the available network resources.

A wireless communications network may include a number of access points. The access points of a cellular network may include a number of base stations, such as NodeBs (NBs) or evolved NodeBs (eNBs). The access points of a wireless local area network (WLAN) may include a number of WLAN access points, such as WiFi nodes. Each access point may support communication for a number of user equipments (UEs) and may often communicate with multiple UEs at the same time. Similarly, each UE may communicate with a number of access points, and may sometimes communicate with multiple access points and/or access points employing different access technologies. An access point may communicate with a UE via downlink and uplink. The downlink (or forward link) refers to the communication link from the access point to the UE, and the uplink (or reverse link) refers to the communication link from the UE to the access point.

As cellular networks become more congested, operators are beginning to look at ways to increase capacity. One approach may include the use of WLANs to offload some of the traffic and/or signaling of a cellular network. WLANs (or WiFi networks) are attractive because, unlike cellular networks that operate in a licensed radio frequency spectrum band, WiFi networks generally operate in an unlicensed radio frequency spectrum band. However, the use of the unlicensed radio frequency spectrum band by both cellular and WiFi devices can lead to interference between cellular and WiFi communications.

SUMMARY

The described features generally relate to one or more improved methods, systems, and/or apparatuses for wireless communications. More particularly, the described features relate to the elimination or mitigation of effects resulting from the receipt of an interference signal along with receipt of a cellular signal in an unlicensed radio frequency spectrum band (e.g., a WiFi spectrum).

A method for wireless communications is described. In one configuration, multiple signals including at least a wireless local area network (WLAN) signal and a cellular signal may be received over a bandwidth of an unlicensed radio frequency spectrum band. Digital samples of the multiple signals may be stored in a buffer. At least a portion of the WLAN signal may be reconstructed from the stored digital samples and removed from the stored digital samples before the contents of the buffer are converted to the frequency domain for demodulation and decoding of the cellular signal by a cellular receiver.

Another method for wireless communications is described. In one configuration, multiple signals may be received over a bandwidth of an unlicensed radio frequency spectrum band, and it may be determined whether to apply codeword-level interference cancelation (CWIC) or symbol-level interference cancelation (SLIC) to remove an interference signal in the multiple signals. The determination may be based at least in part on whether the interference signal is within a desired signal window or a supported bandwidth for a cellular signal in the multiple signals.

Yet another method for wireless communications is described. In one configuration, multiple signals including a cellular signal and an interference signal may be received over a bandwidth of an unlicensed radio frequency spectrum band. A duration of the interference signal may be identified from a preamble of the interference signal, and a cellular receiver configured to demodulate and decode the cellular signal may be adapted based at least in part on the duration of the interference signal.

A method for wireless communications includes receiving, by a cellular receiver, multiple signals having at least a wireless local area network (WLAN) signal and a cellular signal over a bandwidth of an unlicensed radio frequency spectrum band. The method includes storing digital samples of the multiple signals in a buffer. The method further includes reconstructing, by a WLAN receiver, at least a portion of the WLAN signal from the stored digital samples. The method also includes removing the reconstructed portion of the WLAN signal from the stored digital samples before contents of the buffer are converted to a frequency domain for demodulation and decoding of the cellular signal by the cellular receiver.

In some examples, reconstructing at least a portion of the WLAN signal includes detecting a WLAN preamble from the stored digital samples, decoding the WLAN preamble to identify modulation and encoding information for a WLAN payload, and demodulating and decoding at least a portion of the WLAN payload based at least in part on the modulation and encoding information. Reconstructing at least a portion of the WLAN signal may include identifying a duration of the cellular signal in multiple signals, and reconstructing at least a portion of the WLAN signal such that the reconstructed portion of the WLAN signal has a same duration as the duration of the cellular signal. Reconstructing at least a portion of the WLAN signal may include identifying a bandwidth of the cellular signal in the multiple signals, and reconstructing at least a portion of the WLAN signal such that the reconstructed portion of the WLAN signal has a same bandwidth as the bandwidth of the cellular signal. Reconstructing at least a portion of the WLAN signal may include tracking a metric corresponding to an energy of the multiple signals, and reconstructing at least a portion of the WLAN signal until the metric being tracked breaches a threshold value.

In some examples, the method includes accessing, by a WLAN receiver, the stored digital samples from the buffer to perform the reconstructing of at least a portion of the WLAN signal. The WLAN receiver may be configured to perform the reconstructing of at least a portion of the WLAN signal without being associated with an access point that transmitted the WLAN signal. The method may be performed by eNB. The method may be performed by a UE. The cellular receiver may include a Long Term Evolution (LTE) receiver.

An apparatus for wireless communications includes a processor and memory coupled to the processor. The processor is configured to receive, by a cellular receiver, multiple signals having at least a WLAN signal and a cellular signal over a bandwidth of an unlicensed radio frequency spectrum band, store digital samples of the multiple signals in a buffer, reconstruct, by a WLAN receiver, at least a portion of the WLAN signal from the stored digital samples, and remove the reconstructed portion of the WLAN signal from the stored digital samples before contents of the buffer are converted to a frequency domain for demodulation and decoding of the cellular signal by a cellular receiver.

In some examples, the processor may be configured to reconstruct at least a portion of the WLAN signal by detecting a WLAN preamble from the stored digital samples, decoding the WLAN preamble to identify modulation and encoding information for a WLAN payload, and demodulating and decoding at least a portion of the WLAN payload based at least in part on the modulation and encoding information. The processor may be configured to reconstruct at least a portion of the WLAN signal by identifying a duration of the cellular signal in the multiple signals, and reconstructing at least a portion of the WLAN signal such that the reconstructed portion of the WLAN signal has a same duration as the duration of the cellular signal. The processor may be configured to reconstruct at least a portion of the WLAN signal by identifying a bandwidth of the cellular signal in the multiple signals, and reconstructing at least a portion of the WLAN signal such that the reconstructed portion of the WLAN signal has the same bandwidth as the bandwidth of the cellular signal. The processor may be configured to reconstruct at least a portion of the WLAN signal by tracking a metric corresponding to an energy of the multiple signals, and reconstructing at least a portion of the WLAN signal until the metric being tracked breaches a threshold value.

In some examples, the processor may be configured to cause a WLAN receiver to access the stored digital samples from the buffer to perform the reconstructing of at least a portion of the WLAN signal. The WLAN receiver may be configured to perform the reconstructing of at least a portion of the WLAN signal without being associated with an access point that transmitted the WLAN signal.

An apparatus for wireless communications includes means for receiving multiple signals having at least a WLAN signal and a cellular signal over a bandwidth of an unlicensed radio frequency spectrum band. The apparatus also includes means for storing digital samples of the multiple signals in a buffer. The apparatus also includes means for reconstructing at least a portion of the WLAN signal from the stored digital samples. The apparatus further includes means for removing the reconstructed portion of the WLAN signal from the stored digital samples before contents of the buffer are converted to a frequency domain for demodulation and decoding of the cellular signal by a cellular receiver.

In some examples, the means for reconstructing at least a portion of the WLAN signal includes means for detecting a WLAN preamble from the stored digital samples, means for decoding the WLAN preamble to identify modulation and encoding information for a WLAN payload, and means for demodulating and decoding at least a portion of the WLAN payload based at least in part on the modulation and encoding information. The means for reconstructing at least a portion of the WLAN signal may include means for identifying a duration of the cellular signal in the multiple signals, and means for reconstructing at least a portion of the WLAN signal such that the reconstructed portion of the WLAN signal has a same duration as the duration of the cellular signal. The means for reconstructing at least a portion of the WLAN signal may include means for identifying a bandwidth of the cellular signal in the multiple signals, and means for reconstructing at least a portion of the WLAN signal such that the reconstructed portion of the WLAN signal has the same bandwidth as the bandwidth of the cellular signal. The means for reconstructing at least a portion of the WLAN signal may include means for tracking a metric corresponding to an energy of the multiple signals, and means for reconstructing at least a portion of the WLAN signal until the metric being tracked breaches a threshold value.

In some examples, the apparatus further includes means for accessing, by a WLAN receiver, the stored digital samples from the buffer to perform the reconstructing of at least a portion of the WLAN signal. The WLAN receiver may be configured to perform the reconstructing of at least a portion of the WLAN signal without being associated with an access point that transmitted the WLAN signal. The apparatus may be an eNB. The apparatus may be a UE. The cellular receiver may include an LTE receiver.

A non-transitory computer-readable medium for storing instructions executable by a processor includes instructions to receive multiple signals having at least a WLAN signal and a cellular signal over a bandwidth of an unlicensed radio frequency spectrum band, instructions to store digital samples of the multiple signals in a buffer, instructions to reconstruct at least a portion of the WLAN signal from the stored digital samples, and instructions to remove the reconstructed portion of the WLAN signal from the stored digital samples before contents of the buffer are converted to a frequency domain for demodulation and decoding of the cellular signal by a cellular receiver.

In some examples, the non-transitory computer-readable medium may include instructions to reconstruct at least a portion of the WLAN signal by detecting a WLAN preamble from the stored digital samples, decoding the WLAN preamble to identify modulation and encoding information for a WLAN payload, and demodulating and decoding at least a portion of the WLAN payload based at least in part on the modulation and encoding information. The non-transitory computer-readable medium may include instructions to reconstruct at least a portion of the WLAN signal by identifying a duration of the cellular signal in the multiple signals, and reconstructing at least a portion of the WLAN signal such that the reconstructed portion of the WLAN signal has a same duration as the duration of the cellular signal. The non-transitory computer-readable medium may include instructions to reconstruct at least a portion of the WLAN signal by identifying a bandwidth of the cellular signal in the multiple signals, and reconstructing at least a portion of the WLAN signal such that the reconstructed portion of the WLAN signal has the same bandwidth as the bandwidth of the cellular signal.

A method for wireless communications includes receiving multiple signals over a bandwidth of an unlicensed radio frequency spectrum band. The method also includes determining whether to apply codeword-level interference cancelation (CWIC) or symbol-level interference cancelation (SLIC) to remove an interference signal in the multiple signals, where the determination is based at least in part on whether the interference signal is within a desired signal window or a supported bandwidth for a cellular signal in the multiple signals. The interference signal may include a WLAN signal.

In some examples, the method includes applying SLIC to remove the interference signal when a determination is made that the interference signal is at least partly outside the supported bandwidth. The method may include applying CWIC or SLIC to remove the interference signal when a determination is made that the interference signal is within the supported bandwidth. The method may include applying CWIC or SLIC to remove the interference signal when a determination is made that the interference signal is outside the supported bandwidth and when the interference signal is reconstructed using an expanded bandwidth.

In some examples, the method includes applying SLIC to remove the interference signal when a determination is made that the interference signal is at least partly outside the desired signal window. The method may include applying CWIC or SLIC to remove the interference signal when a determination is made that the interference signal is within the desired signal window. The method may include applying CWIC or SLIC to remove the interference signal when a determination is made that the interference signal is outside the desired signal window and when the interference signal is reconstructed using an expanded signal window.

An apparatus for wireless communications includes a processor and memory coupled to the processor. The processor is configured to receive multiple signals over a bandwidth of an unlicensed radio frequency spectrum band, determine whether to apply CWIC or SLIC to remove an interference signal in the multiple signals, where the determination is based at least in part on whether the interference signal is within a desired signal window or a supported bandwidth for a cellular signal in the multiple signals. The interference signal may include a WLAN signal.

In some examples, the processor may be configured to apply SLIC to remove the interference signal when a determination is made that the interference signal is at least partly outside the supported bandwidth. The processor may be configured to apply CWIC or SLIC to remove the interference signal when a determination is made that the interference signal is within the supported bandwidth. The processor may be configured to apply CWIC or SLIC to remove the interference signal when a determination is made that the interference signal is outside the supported bandwidth and when the interference signal is reconstructed using an expanded bandwidth.

In some examples, the processor may be configured to apply SLIC to remove the interference signal when a determination is made that the interference signal is at least partly outside the desired signal window. The processor may be configured to apply CWIC or SLIC to remove the interference signal when a determination is made that the interference signal is within the desired signal window. The processor may be configured to apply CWIC or SLIC to remove the interference signal when a determination is made that the interference signal is outside the desired signal window and when the interference signal is reconstructed using an expanded signal window.

An apparatus for wireless communications includes means for receiving multiple signals over a bandwidth of an unlicensed radio frequency spectrum band. The apparatus also includes means for determining whether to apply CWIC or SLIC to remove an interference signal in the multiple signals, where the determination is based at least in part on whether the interference signal is within a desired signal window or a supported bandwidth for a cellular signal in the multiple signal. The interference signal may include a WLAN signal.

In some examples, the apparatus includes means for applying SLIC to remove the interference signal when a determination is made that the interference signal is at least partly outside the supported bandwidth. The apparatus may include means for applying CWIC or SLIC to remove the interference signal when a determination is made that the interference signal is within the supported bandwidth. The apparatus may include means for applying CWIC or SLIC to remove the interference signal when a determination is made that the interference signal is outside the supported bandwidth and when the interference signal is reconstructed using an expanded bandwidth.

In some examples, the apparatus includes means for applying SLIC to remove the interference signal when a determination is made that the interference signal is at least partly outside the desired signal window. The apparatus may include means for applying CWIC or SLIC to remove the interference signal when a determination is made that the interference signal is within the desired signal window. The apparatus may include means for applying CWIC or SLIC to remove the interference signal when a determination is made that the interference signal is outside the desired signal window and when the interference signal is reconstructed using an expanded signal window.

A non-transitory computer-readable medium for storing instructions executable by a processor includes instructions to receive multiple signals over a bandwidth of an unlicensed radio frequency spectrum band, and instructions to determine whether to apply CWIC or SLIC to remove an interference signal in the multiple signals, where the determination is based at least in part on whether the interference signal is within a desired signal window or a supported bandwidth for a cellular signal in the multiple signals. The interference signal may include a WLAN signal.

A method for wireless communications includes receiving multiple signals over a bandwidth of an unlicensed radio frequency spectrum band, where the multiple signals have a cellular signal and an interference signal. The method includes identifying a duration of the interference signal from a preamble of the interference signal. The method also includes adapting, based at least in part on the duration of the interference signal, a cellular receiver configured to demodulate and decode the cellular signal. The interference signal may include a WLAN signal.

In some examples, adapting the cellular receiver includes applying a first noise estimation technique to the cellular signal during the interference signal, and applying a second noise estimation technique to the cellular signal outside the duration of the interference signal. Adapting the cellular receiver may include applying a first noise estimation resolution to the cellular signal during the interference signal, and applying a second noise estimation resolution to the cellular signal outside the duration of the interference signal. Adapting the cellular receiver may include identifying code blocks in the cellular signal that occur during the interference signal, and decoding the identified code blocks before decoding any remaining code blocks in the cellular signal that occur outside the duration of the interference signal. Adapting the cellular receiver may include removing, from a channel state information (CSI) report, information about the interference signal when the duration of the interference signal is less than a threshold value.

An apparatus for wireless communications includes a processor and memory coupled to the processor. The processor is configured to receive multiple signals over a bandwidth of an unlicensed radio frequency spectrum band, where the multiple signals have a cellular signal and an interference signal, identify a duration of the interference signal from a preamble of the interference signal, adapt, based at least in part on the duration of the interference signal, a cellular receiver configured to demodulate and decode the cellular signal. The interference signal may include a WLAN signal.

In some examples, the processor may be configured to adapt the cellular receiver by applying a first noise estimation technique to the cellular signal during the interference signal, and to apply a second noise estimation technique to the cellular signal outside the duration of the interference signal. The processor may be configured to adapt the cellular receiver by applying a first noise estimation resolution to the cellular signal during the interference signal, and applying a second noise estimation resolution to the cellular signal outside the duration of the interference signal. The processor may be configured to adapt the cellular receiver by identifying code blocks in the cellular signal that occur during the interference signal, and decoding the identified code blocks before decoding any remaining code blocks in the cellular signal that occur outside the duration of the interference signal.

An apparatus for wireless communications includes means for receiving multiple signals over a bandwidth of an unlicensed radio frequency spectrum band, where the multiple signals have a cellular signal and an interference signal. The apparatus includes means for identifying a duration of the interference signal from a preamble of the interference signal. The apparatus includes means for adapting, based at least in part on the duration of the interference signal, a cellular receiver configured to demodulate and decode the cellular signal. The interference signal may include a WLAN signal.

In some examples, the means for adapting the cellular receiver includes means for applying a first noise estimation technique to the cellular signal during the interference signal, and means for applying a second noise estimation technique to the cellular signal outside the duration of the interference signal. The means for adapting the cellular receiver may include means for applying a first noise estimation resolution to the cellular signal during the interference signal, and means for applying a second noise estimation resolution to the cellular signal outside the duration of the interference signal. The means for adapting the cellular receiver may include means for identifying code blocks in the cellular signal that occur during the interference signal, and means for decoding the identified code blocks before decoding any remaining code blocks in the cellular signal that occur outside the duration of the interference signal. The means for adapting the cellular receiver may include means for removing, from a CSI report, information about the interference signal when the duration of the interference signal is less than a threshold value.

A non-transitory computer-readable medium for storing instructions executable by a processor includes instructions to identify a duration of the interference signal from a preamble of the interference signal, and instructions to adapt, based at least in part on the duration of the interference signal, a cellular receiver configured to demodulate and decode the cellular signal. The interference signal may include a WLAN signal.

In some examples, the instructions executable by the processor to adapt the cellular receiver may include instructions to apply a first noise estimation technique to the cellular signal during the interference signal, and to apply a second noise estimation technique to the cellular signal outside the duration of the interference signal. The instructions executable by the processor to adapt the cellular receiver may include instructions to apply a first noise estimation resolution to the cellular signal during the interference signal, and to apply a second noise estimation resolution to the cellular signal outside the duration of the interference signal. The instructions executable by the processor to adapt the cellular receiver may include instructions to identify code blocks in the cellular signal that occur during the interference signal, and to decode the identified code blocks before decoding any remaining code blocks in the cellular signal that occur outside the duration of the interference signal. The instructions executable by the processor to adapt the cellular receiver may include instructions to remove, from a CSI report, information about the interference signal when the duration of the interference signal is less than a threshold value.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
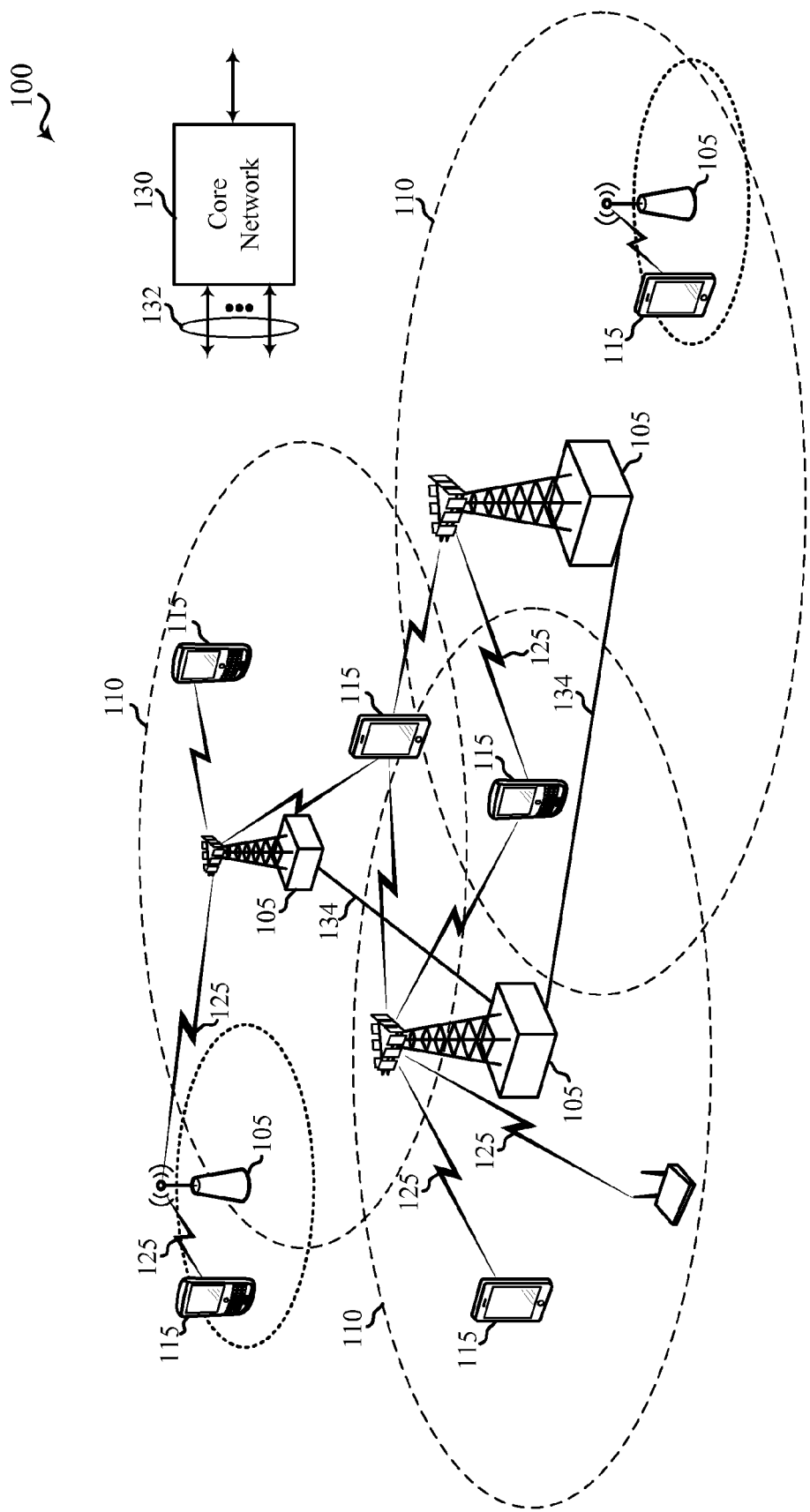
FIG. 1 shows a diagram of a wireless communications system.

Techniques are described in which an unlicensed radio frequency spectrum band (e.g., a spectrum band typically used for WiFi communications) may be used for cellular communications (e.g., LTE communications).

When traffic is offloaded from a licensed radio frequency spectrum band of a cellular network (e.g., an LTE network) to an unlicensed radio frequency spectrum band (e.g., the unlicensed radio frequency spectrum band used by WLAN or WiFi networks), interference between cellular and WLAN signals may occur. Even when procedures such as Listen Before Talk (LBT) are used by cellular devices wanting to communicate over the unlicensed radio frequency spectrum band, there may be scenarios in which a WiFi device does not realize the unlicensed radio frequency spectrum band is in use by the cellular devices and proceeds to transmit a signal or signals that overlap in time and/or frequency with the signals transmitted by the cellular devices. In one example, a WiFi device may not detect communications from cellular devices over the unlicensed radio frequency spectrum band (e.g., signal too weak at WiFi device) and may transmit signals that overlap with those of the cellular devices. In another example, a WiFi device may gain access to the unlicensed radio frequency spectrum band at the same time as a cellular device, which may cause the devices to transmit signals that overlap each other. Techniques for removing interference signals (e.g., WLAN or WiFi signals) from cellular signals are therefore needed.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system 100. The wireless communications system 100 includes a plurality of access points (e.g., base stations, eNBs, or WLAN access points) 105, a number of user equipments (UEs) 115, and a core network 130. Some of the access points 105 may communicate with the UEs 115 under the control of a base station controller (not shown), which may be part of the core network 130 or certain access points 105 (e.g., base stations or eNBs) in various examples. Some of the access points 105 may communicate control information and/or user data with the core network 130 through backhaul 132. In some examples, some of the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communications link 125 may be a multi-carrier signal modulated according to various radio technologies. Each modulated signal may be sent on a different carrier and may carry control information (e.g., reference signals, control channels, etc.), overhead information, data, etc.

The access points 105 may wirelessly communicate with the UEs 115 via one or more access point antennas. Each of the access points 105 may provide communication coverage for a respective coverage area 110. In some examples, an access point 105 may be referred to as a base station, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a WiFi node or some other suitable terminology. The coverage area 110 for an access point may be divided into sectors making up a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies. The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In some examples, the wireless communications system 100 may include an LTE/LTE-A communications system (or network) that supports one or more unlicensed radio frequency spectrum band modes of operation or deployment scenarios. In other examples, the wireless communications system 100 may support wireless communications using an unlicensed radio frequency spectrum band and an access technology different from LTE/LTE-A, or a licensed radio frequency spectrum band and an access technology different from LTE/LTE-A. In LTE/LTE-A communications systems, the term evolved NodeB or eNB may be generally used to describe of the access points 105. The wireless communications system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul 132 (e.g., through core network 130). The wireless communications system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, pico eNBs, femto eNBs, relays, and the like. A UE 115 may also be able to communicate over different access networks, such as cellular or other WWAN access networks, or WLAN access networks.

The communications links 125 shown in wireless communications system 100 may include uplinks for carrying uplink (UL) transmissions (e.g., from a UE 115 to an eNB 105) and/or downlinks for carrying downlink (DL) transmissions (e.g., from an eNB 105 to a UE 115). The UL transmissions may also be called reverse link transmissions, while the DL transmissions may also be called forward link transmissions. The uplink transmissions may be made using a licensed radio frequency spectrum band, an unlicensed radio frequency spectrum band, or both. Similarly, the downlink transmissions may be made using a licensed radio frequency spectrum band, an unlicensed radio frequency spectrum band, or both.

In some examples of the wireless communications system 100, various deployment scenarios for an unlicensed radio frequency spectrum band may be supported including a supplemental downlink mode in which LTE downlink capacity in a licensed radio frequency spectrum band may be offloaded to an unlicensed radio frequency spectrum band, a carrier aggregation mode in which both LTE downlink and uplink capacity may be offloaded from a licensed radio frequency spectrum band to an unlicensed radio frequency spectrum band, and a standalone mode in which LTE downlink and uplink communications between a base station (e.g., eNB) and a UE may take place in an unlicensed radio frequency spectrum band. Base stations or eNBs 105 as well as UEs 115 may support one or more of these or similar modes of operation. OFDMA communications signals may be used in the communications links 125 for LTE downlink transmissions in an unlicensed and/or a licensed radio frequency spectrum band, while SC-FDMA communications signals may be used in the communications links 125 for LTE uplink transmissions in an unlicensed and/or a licensed radio frequency spectrum band. Additional details regarding the implementation of unlicensed radio frequency spectrum band deployment scenarios or modes of operation in a system such as the wireless communications system 100, as well as other features and functions related to the operation of the unlicensed radio frequency spectrum band, are provided below with reference to FIGS. 2-16.

In some examples, a UE 115 may receive a combination of signals that include a wireless local area network (WLAN) signal and a cellular signal over a bandwidth of an unlicensed radio frequency spectrum. The signals may be received from one or more access points and/or eNBs 105. The UE 115 may remove at least a portion of the WLAN signal before demodulation and decoding of the cellular signal by the UE 115.

In some examples, an eNB 105 may receive a combination of signals that include a wireless local area network (WLAN) signal and a cellular signal over a bandwidth of an unlicensed radio frequency spectrum. The signals may be received from one or more UEs 115. The eNB 105 may remove at least a portion of the WLAN signal before demodulation and decoding of the cellular signal by the eNB 105.

Figure 2:
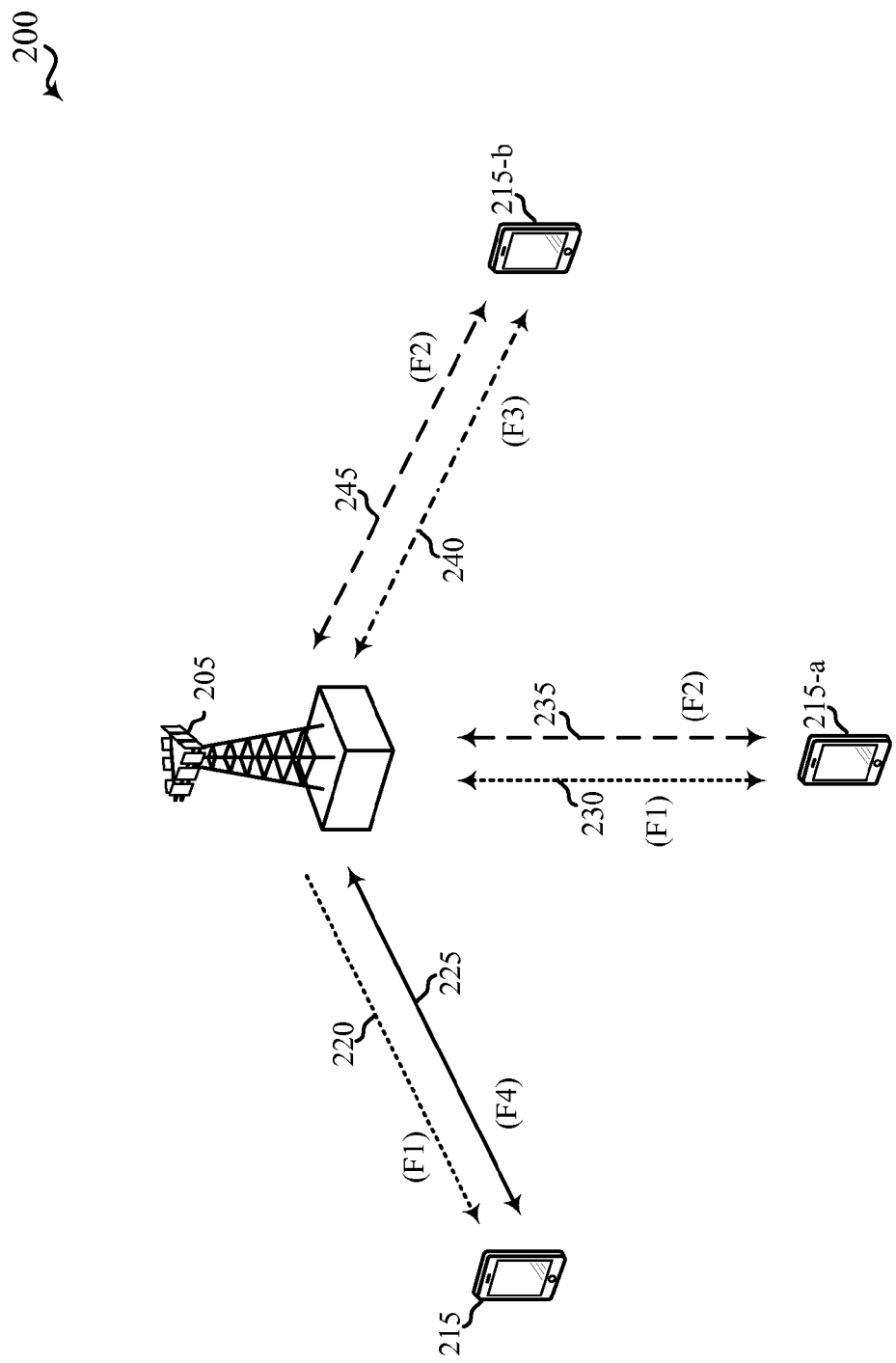
FIG. 2 shows a diagram of a wireless communications system that illustrates examples of deployment scenarios for using Long Term Evolution (LTE) in an unlicensed radio frequency spectrum band according to various examples.

Turning next to FIG. 2, a wireless communications system 200 illustrates examples of a supplemental downlink mode and of a carrier aggregation mode for an LTE network that supports an unlicensed radio frequency spectrum band. The wireless communications system 200 may be an example of portions of the wireless communications system 100 described with reference to FIG. 1. Moreover, the eNB 205 may be an example of one or more aspects of the access points 105 described with reference to FIG. 1, while the UEs 215 may be examples of one or more aspects of the UEs 115 described with reference to FIG. 1.

In the example of a supplemental downlink mode in wireless communications system 200, the eNB 205 may transmit OFDMA communications signals to a UE 215 using a downlink 220. The downlink 220 may be associated with a frequency F1 in an unlicensed radio frequency spectrum band. The eNB 205 may transmit OFDMA communications signals to the same UE 215 using a bidirectional link 225 and may receive SC-FDMA communications signals from that UE 215 using the bidirectional link 225. The bidirectional link 225 may be associated with a frequency F4 in a licensed radio frequency spectrum band. The downlink 220 in the unlicensed radio frequency spectrum band and the bidirectional link 225 in the licensed radio frequency spectrum band may operate concurrently. The downlink 220 may provide a downlink capacity offload for the eNB 205. In some examples, the downlink 220 may be used for unicast services (e.g., addressed to one UE) or for multicast services (e.g., addressed to several UEs). This scenario may occur with any service provider (e.g., a traditional mobile network operator or MNO) that uses a licensed radio frequency spectrum band and needs to relieve some of the traffic and/or signaling congestion.

In one example of a carrier aggregation mode in wireless communications system 200, the eNB 205 may transmit OFDMA communications signals to a UE 215-a using a bidirectional link 230 and may receive SC-FDMA communications signals from the same UE 215-a using the bidirectional link 230. The bidirectional link 230 may be associated with the frequency F1 in the unlicensed radio frequency spectrum band. The eNB 205 may also transmit OFDMA communications signals to the same UE 215-a using a bidirectional link 235 and may receive SC-FDMA communications signals from the same UE 215-a using the bidirectional link 235. The bidirectional link 235 may be associated with a frequency F2 in a licensed radio frequency spectrum band. The bidirectional link 230 may provide a downlink and uplink capacity offload for the eNB 205. Like the supplemental downlink described above, this scenario may occur with any service provider (e.g., an MNO) that uses a licensed radio frequency spectrum band and needs to relieve some of the traffic and/or signaling congestion.

In another example of a carrier aggregation mode in wireless communications system 200, the eNB 205 may transmit OFDMA communications signals to a UE 215-b using a bidirectional link 240 and may receive SC-FDMA communications signals from the same UE 215-b using the bidirectional link 240. The bidirectional link 240 may be associated with the frequency F3 in an unlicensed radio frequency spectrum band. The eNB 205 may also transmit OFDMA communications signals to the same UE 215-b using a bidirectional link 245 and may receive SC-FDMA communications signals from the same UE 215-b using the bidirectional link 245. The bidirectional link 245 may be associated with the frequency F2 in the licensed radio frequency spectrum band. The bidirectional link 240 may provide a downlink and uplink capacity offload for the eNB 205. This example and those provided above are presented for illustrative purposes and there may be other similar modes of operation or deployment scenarios that combine licensed and unlicensed radio frequency spectrum bands for capacity offload.

As described above, the typical service provider that may benefit from the capacity offload offered by using an unlicensed radio frequency spectrum band is a traditional MNO with a licensed radio frequency spectrum band. For these service providers, an operational configuration may include a bootstrapped mode (e.g., supplemental downlink, carrier aggregation) that uses the primary component carrier (PCC) on the licensed radio frequency spectrum band and the secondary component carrier (SCC) on the unlicensed radio frequency spectrum band.

In the supplemental downlink mode, control for the unlicensed radio frequency spectrum band may be transported over the licensed radio frequency spectrum band uplink (e.g., uplink portion of the bidirectional link 225). One of the reasons to provide downlink capacity offload is because data demand is largely driven by downlink consumption. Moreover, in this mode, there may not be a regulatory impact since the UE 215 is not transmitting in the unlicensed radio frequency spectrum band.

In the carrier aggregation mode, data and control may be communicated in the licensed radio frequency spectrum band (e.g., bidirectional links 235 and 245) while data may be communicated in the unlicensed radio frequency spectrum band (e.g., bidirectional links 230 and 240). The carrier aggregation mechanisms supported when using the unlicensed radio frequency spectrum band may fall under a hybrid frequency division duplexing-time division duplexing (FDD-TDD) carrier aggregation or a TDD-TDD carrier aggregation with different symmetry across component carriers.

In some examples, one or more of the UEs 215, 215-a, and/or 215-b may receive a combination of signals that include a wireless local area network (WLAN) signal and a cellular signal over a bandwidth of an unlicensed radio frequency spectrum. The signals may be received from the eNB 205. The UEs 215, 215-a, and/or 215-b may remove at least a portion of the WLAN signal before demodulation and decoding of the cellular signal.

In some examples, the eNB 205 may receive a combination of signals that include a wireless local area network (WLAN) signal and a cellular signal over a bandwidth of an unlicensed radio frequency spectrum. The signals may be received from one or more of the UEs 215, 215-a, and/or 215-b. The eNB 205 may remove at least a portion of the WLAN signal before demodulation and decoding of the cellular signal by the eNB 205.

Figure 3:
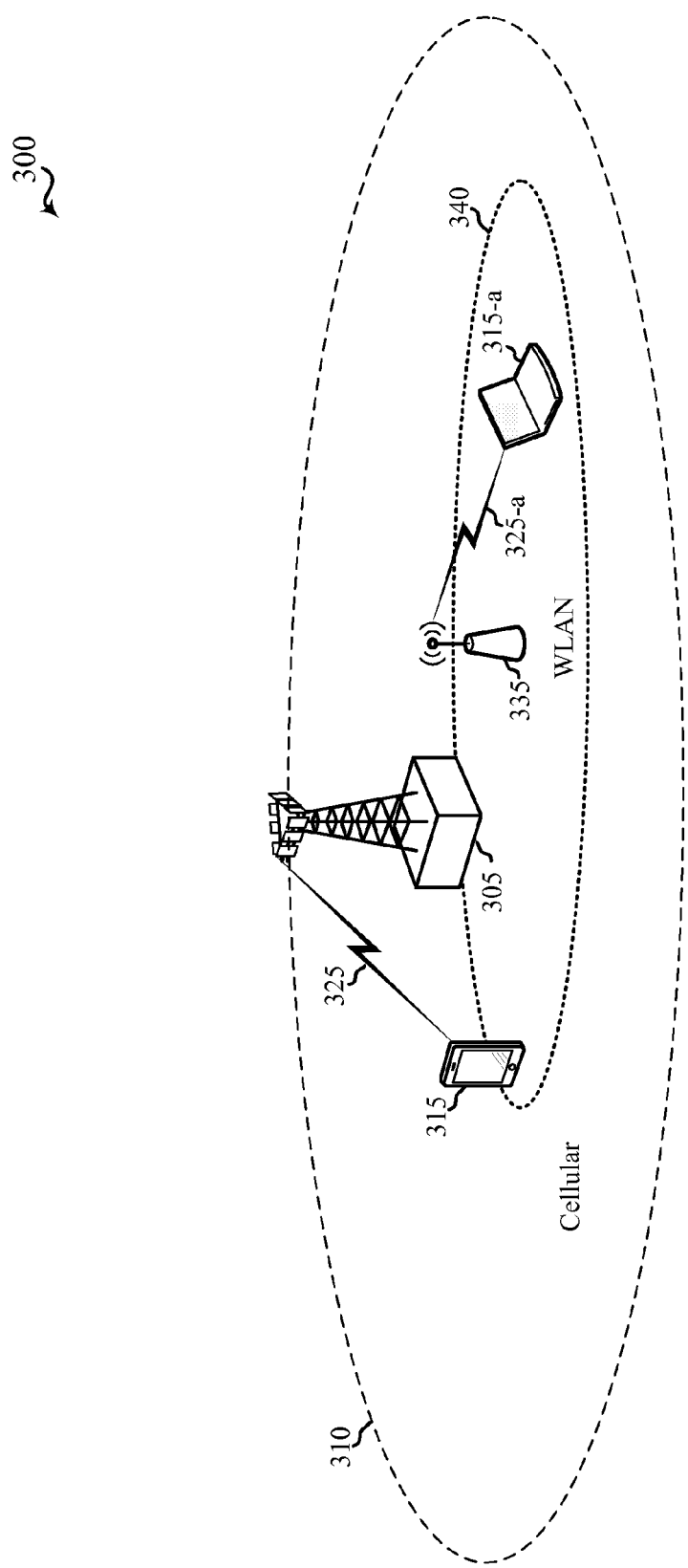
FIG. 3 shows a diagram of a wireless communications system in which interference may occur, according to various examples.

FIG. 3 is a diagram illustrating a wireless communications system 300 in which communications 325, 325-a between different ones of the system's access points 305, 335 and UEs 315, 315-a may interfere with one another. The wireless communications system 300 may be an example of portions of the wireless communications system 100 and/or 200 described with reference to FIGS. 1 and/or 2. Moreover, the access points 305, 335 may be examples of one or more aspects of the access points 105 described with reference to FIG. 1 or the eNB 205 described with reference to FIG. 2, while the UEs 315, 315-a may be examples of one or more aspects of the UEs 115 and/or 215 described with reference to FIGS. 1 and/or 2.

During a normal course of operation of the wireless communications system 300, the eNB 305 may communicate with one or more UEs (e.g., UE 315) within in its coverage area, while the WLAN access point 335 may communicate with one or more UEs (e.g., WiFi device 315-*a*) within its coverage area 340. When the eNB 305 and UE 315 communicate over a licensed radio frequency spectrum band (e.g., an LTE spectrum) of a cellular network and the WLAN access point 335 and WiFi device 315-*a* communicate over a separate, unlicensed radio frequency spectrum band (e.g., a WiFi spectrum band), interference between the communications 325 and 325-*a* may be largely or completely avoided. However, when the eNB 305/UE 315 and WLAN access point 335/WiFi device 315-*a* communicate over the same spectrum band (e.g., the WiFi spectrum band), or communicate over spectrums that overlap, there exists a substantially greater potential for interference between the communications 325 and 325-*a* of the different devices.

One way to reduce the likelihood of interference between devices communicating over the same or overlapping spectrums (and possibly via different radio access technologies (RATs)) is to utilize a contention-based protocol, such as Listen Before Talk (LBT). Under an LBT protocol, a device (e.g., the eNB 305) wanting to communicate over a channel may listen to the channel to ensure that the channel is "clear" (i.e., ensure that no other device is using the channel), and then broadcast a signal to reserve the channel (e.g., a signal that other devices will interpret as a sign the channel is in use). The device may then ask a device with which it wants to communicate (e.g., the UE 315) to also ensure the channel is clear. This may be a result of the different devices 305, 315-*a* having different coverage areas, or as a precaution given that a device within the coverage area 310 of the first device (e.g., eNB 305) may not have received the reservation signal broadcast by the first device.

Despite the use of LBT or other contention-based protocols, scenarios may arise in which the eNB 305/UE 315 and the WLAN access point 335/WiFi device 315-*a* simultaneously communicate over the same spectrum (e.g., an unlicensed radio frequency spectrum band). In a system using an unlicensed radio frequency spectrum band, receivers that are able to eliminate or mitigate the effects of interference signals (e.g., unwanted WLAN signals) on cellular signals may therefore be desirable.

Figure 4:
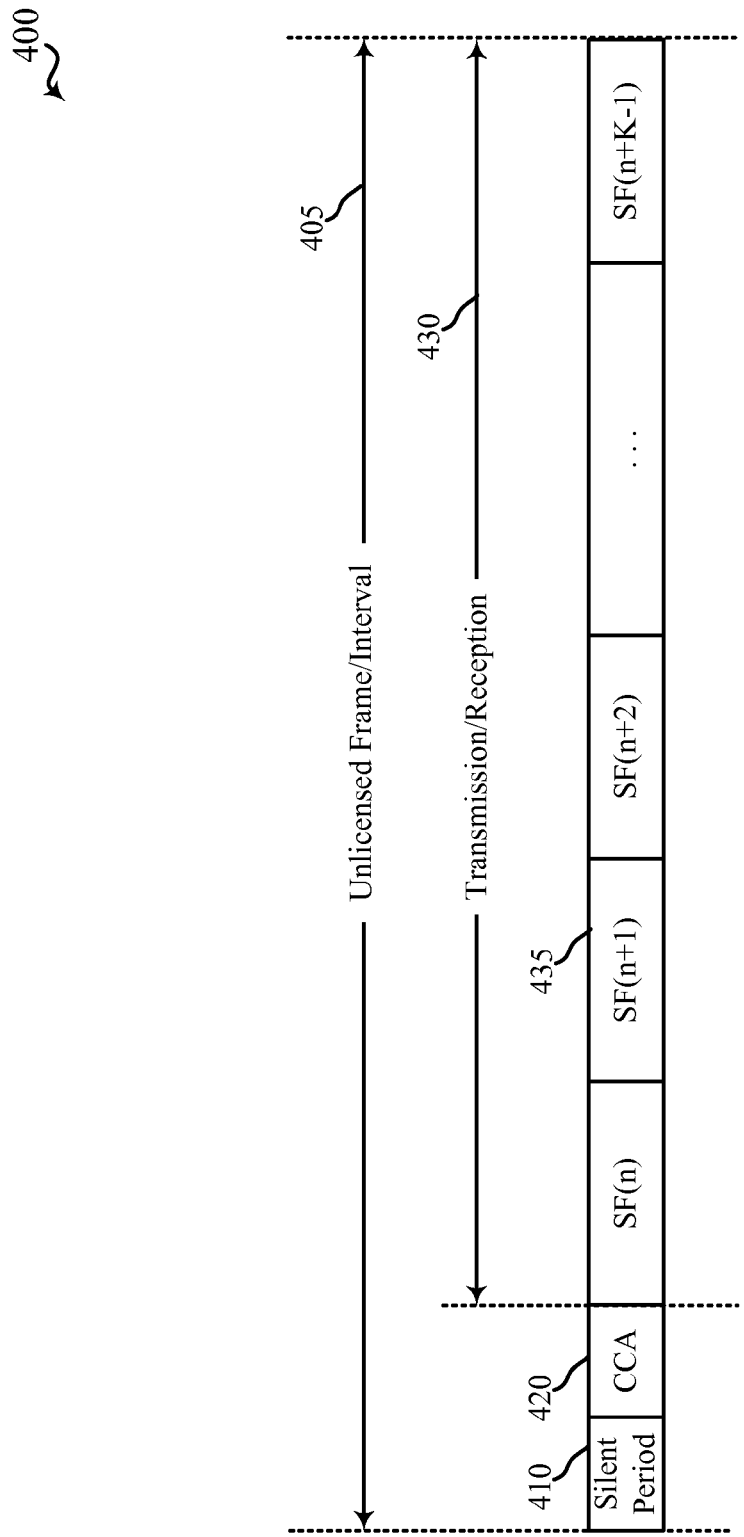
FIG. 4 illustrates an example format of an unlicensed frame/interval having a transmission/reception period according to various examples.

FIG. 4 illustrates an example format 400 of an unlicensed frame/interval 405 (e.g., a frame, subframe, or interval) usable for unlicensed radio frequency spectrum band communications between the cellular devices (e.g., eNBs and UEs) described with reference to any of FIGS. 1, 2, and/or 3. In some examples, the unlicensed frame/interval 405 may be an example of a frame used by one or more of the eNBs 105, 205, and/or 305 described with reference to FIGS. 1, 2, and/or 3 and one or more of the UEs 115, 215, and/or 315 described with reference to FIGS. 1, 2, and/or 3. The unlicensed frame/interval 405 may include a silent period 410, a Clear Channel Assessment (CCA) slot period 420, and/or a transmission/reception period 430. In some cases, the unlicensed frame/interval 405 may have a duration of five or ten milliseconds. In other cases, the unlicensed frame/interval 405 may have a duration of one or two milliseconds.

The unlicensed frame/interval 405 may define the application of a contention-based protocol, such as a Listen Before Talk (LBT) protocol based on the LBT protocol specified in ETSI (EN 301 893). When using a frame/interval that defines the application of LBT, the frame/interval may indicate when a transmitting device needs to perform a Clear Channel Assessment (CCA). The outcome of the CCA indicates to the transmitting device whether a channel of the unlicensed radio frequency spectrum band is available or in use. When the CCA indicates that the channel is available (e.g., "clear" for use), the frame/interval may allow the transmitting device to use the channel—typically for a predefined transmission period. When the CCA indicates that the channel is not available (e.g., in use or reserved), the frame/interval may prevent the transmitting device from using the channel during the transmission period.

In some cases, it may be useful for cellular devices capable of communicating over an unlicensed radio frequency spectrum band to synchronize to a periodic frame structure (e.g., an LTE frame structure) to which the unlicensed frame/interval 405 is also synchronized. For example, a boundary of the unlicensed frame/interval 405 may be synchronized with a boundary of the periodic frame structure.

The silent period 410 may occur at various points within the unlicensed frame/interval 405, such as the beginning or end, and in some cases may be split into two or more silent periods. By way of example, the silent period 410 is shown to occur at the beginning of the unlicensed frame/interval 405. The silent period 410 may be used to comply with channel occupancy requirements. In some instances, the silent period 410 may have a minimum duration of five percent of the duration of the unlicensed frame/interval 405.

The CCA slot period 420 may include a number of CCA slots. For example, the CCA slot period 420 may include seven CCA slots. In some cases, one of the CCA slots may be pseudo-randomly selected by an eNB for performing CCA to determine availability of the unlicensed radio frequency spectrum band. The CCA slots may be pseudo-randomly selected such that some or all of the eNBs of a same operator deployment perform CCA in a common one of the CCA slots, and the eNBs of different operator deployments perform CCA in different ones of the CCA slots. In successive instances of the unlicensed frame/interval, the pseudo-random selection of CCA slots may result in different operator deployments selecting the first of the CCA slots. In this manner, each of a number of operator deployments may be given the first chance to perform CCA (e.g., a first operator deployment may select the first CCA slot in one unlicensed frame/interval, a second operator deployment may select the first CCA slot in a next frame/interval, etc.). In some instances, the CCA slots may each have a duration of approximately 20 microseconds.

When an eNB performs CCA to determine availability of an unlicensed radio frequency spectrum band and determines that the unlicensed radio frequency spectrum band is available, the eNB may reserve the transmission/reception period 430. The transmission/reception period 430 may include a number of subframes, labeled SF(n), SF(n+1), SF(n+2), . . . , SF(n+K−1) in FIG. 4. In some cases, multiple coordinated eNBs (e.g., two or more coordinated eNBs) may reserve the transmission/reception period 430 and transmit or receive data. The simultaneous use of the transmission/reception period 430 by more than one eNB may be possible as a result of orthogonal transmissions, multiplexed transmissions, and/or the use of other time and/or frequency sharing mechanisms employed by a set of coordinated eNBs.

Figure 5A:
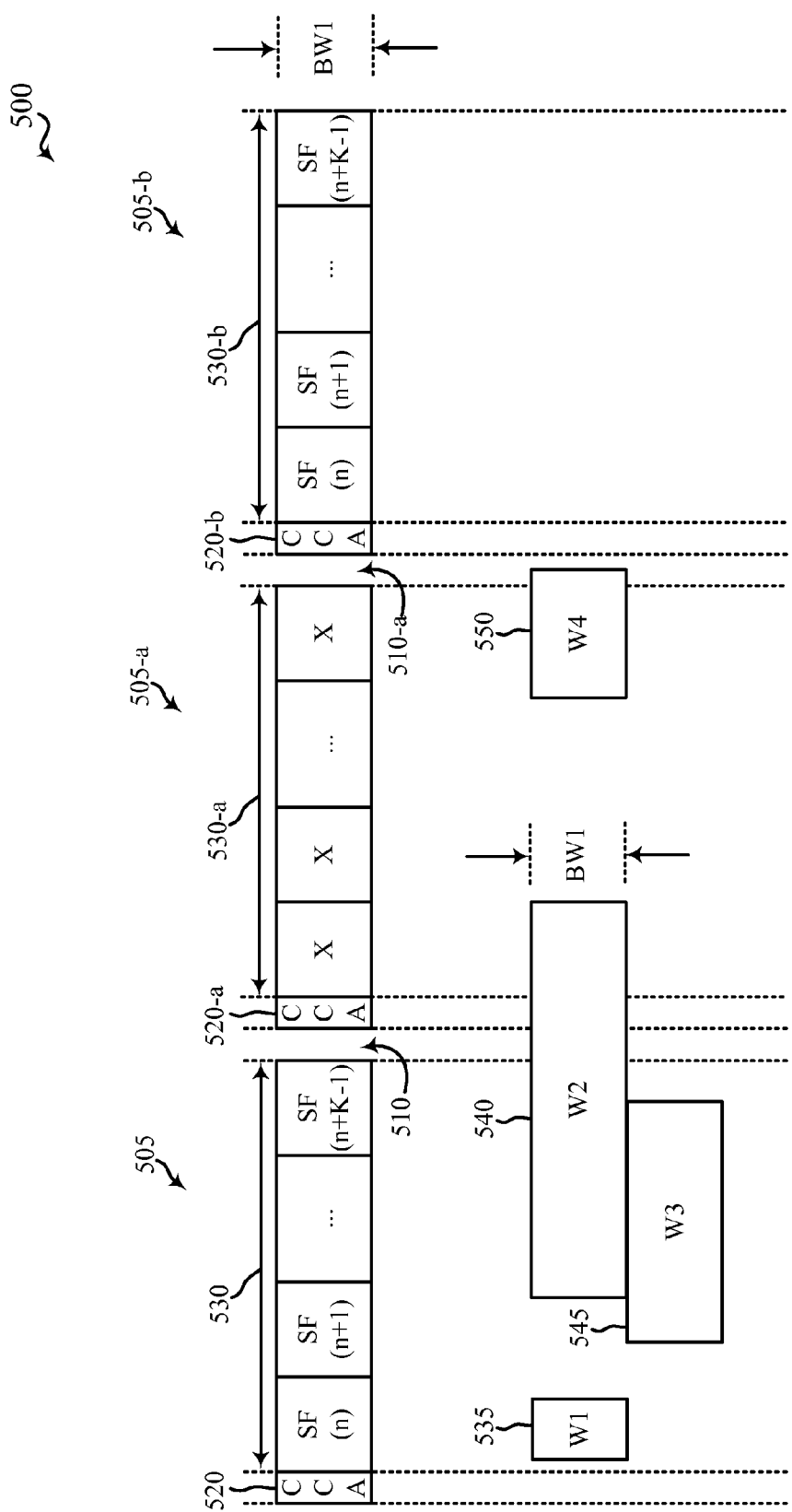
FIGS. 5A and 5B illustrate examples of interference between cellular and WLAN signals according to various examples.

FIG. 5A illustrates an example scenario 500 in which one or more cellular devices (e.g., eNBs and/or UEs) communicate over an unlicensed radio frequency spectrum band in accord with an unlicensed frame/interval 505, but encounter interference from simultaneous or overlapping transmissions made by one or more WLAN devices. In some cases, the cellular device may include one or more of the eNBs 105, 205, and/or 305 and/or UEs 115, 215, and/or 315 described with reference to FIGS. 1, 2, and/or 3.

In a first unlicensed frame/interval 505, one or more cellular devices may successfully perform CCA within a CCA period 520 after a silent period 510, and may subsequently transmit or receive data over the unlicensed radio frequency spectrum band (BW1) during the transmission/reception period or signal window 530. However, one or more WLAN devices may also transmit during the signal window 530. The transmissions W1 535 and W3 545 are made entirely within the signal window 530, and the transmission W2 540 overlaps the signal window 530 and finishes outside the signal window 530. The transmissions W1 535 and W2 540 occur within the same bandwidth (BW1) as the transmissions made by a number of cellular devices during the signal window 530. The transmission W3 545 may occur within or outside of the bandwidth (BW1). In some cases, BW1 may be approximately 20 megahertz (MHz).

In a second unlicensed frame/interval 505-*a*, there is no cellular device that successfully performs CCA during the CCA period 520-*a* after a silent period 510-*a*, so there are no cellular devices that transmit during the signal window 530-*a*. However, a WLAN device makes the transmission W4 550.

In a third unlicensed frame/interval 505-*b*, one or more cellular devices may successfully perform CCA within a CCA period 520-*b* after a silent period 510-*b*, and may subsequently transmit or receive data over the unlicensed radio frequency spectrum band (BW1) during the signal window 530-*b*. There are no WLAN devices that transmit during the signal window 530-*b*.

Because the transmissions W1 535, W2 540, and W3 545 may interfere with the reception of signals transmitted by the cellular devices within the bandwidth BW1 and signal window 530, receivers that are able to eliminate or mitigate the effects of the transmissions W1 535, W2 540, and W3 545 (i.e., the interference signals) on the cellular signals are desirable.

The interference signals (e.g., W1 535, W2 540, and W3 545) are typically asynchronous. For example, the interference signals tend to be asynchronous with respect to unlicensed radio frequency spectrum band transmissions. They are also bursty with variable lengths or durations compared to the unlicensed frame/interval. Signals such as request-to-send (RTS), clear-to-send (CTS), beacons, acknowledgment (ACK), and data packets have wide-varying durations (e.g., from 40 microseconds to 5.484 milliseconds). Moreover, the number of interfering signals can vary over the duration of the unlicensed radio frequency spectrum band transmission/reception period.

Figure 5B:
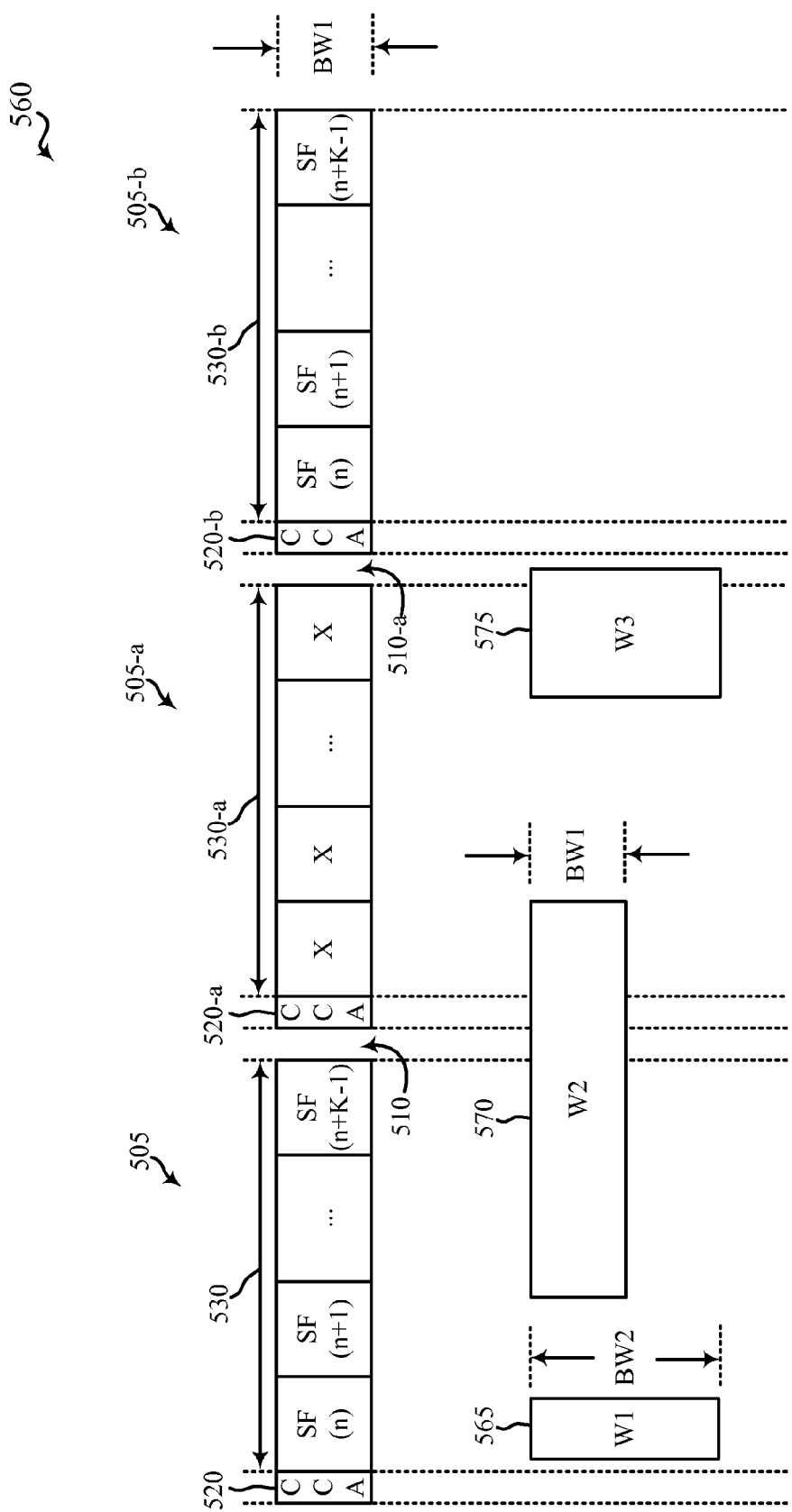

FIG. 5B illustrates an example scenario 560 in which one or more cellular devices (e.g., eNBs and/or UEs) communicate over an unlicensed radio frequency spectrum band in accord with an unlicensed frame/interval 505, but encounter interference from simultaneous or overlapping transmissions made by one or more WLAN devices. In some cases, the cellular device may include one or more of the eNBs 105, 205, and/or 305 and/or UEs 115, 215, and/or 315 described with reference to FIGS. 1, 2, and/or 3.

In a first unlicensed frame/interval 505, one or more cellular devices may successfully perform CCA within a CCA period 520 after a silent period 510, and may subsequently transmit or receive data over the unlicensed radio frequency spectrum band (BW1) during the transmission/reception period or signal window 530. However, one or more WLAN devices may also transmit during the signal window 530. The transmission W1 565 is made entirely within the signal window 530, but its bandwidth (BW2) extends beyond the bandwidth (BW1) of the transmission made by the cellular device(s). The transmission W2 570 overlaps the signal window 530 and finishes outside the signal window 530, but is made within the same bandwidth (BW1) used for transmissions by the cellular device(s). In some cases, BW1 may be approximately 20 MHz and BW2 may be approximately 40 MHz.

In a second unlicensed frame/interval 505-*a*, there is no cellular device that successfully performs CCA during the CCA period 520-*a* after a silent period 510-*a*, so there are no cellular devices that transmit during the signal window 530-*a*. However, a WLAN device makes the transmission W3 575 using the bandwidth BW2.

In a third unlicensed frame/interval 505-*b*, one or more cellular devices may successfully perform CCA within a CCA period 520-*b* after a silent period 510-*b*, and may subsequently transmit or receive data over the unlicensed radio frequency spectrum band (BW1) during the signal window 530-*b*. There are no WLAN devices that transmit during the signal window 530-*b*.

Because the transmissions W1 565 and W2 570 may interfere with the reception of signals transmitted by the cellular devices within the bandwidth BW1 and signal window 530, receivers that are able to eliminate or mitigate the effects of the transmissions W1 565 and W2 570 (i.e., the interference signals) on the cellular signals are desirable.

The interference signals (e.g., W1 565 and W2 570) can have a transmission bandwidth that is variable over time. For example, the transmission bandwidth of the interfering signals can be 20 MHz, 40 MHz, 80 MHz, 160 MHz, or 80 MHz+80 MHz.

Figure 6:
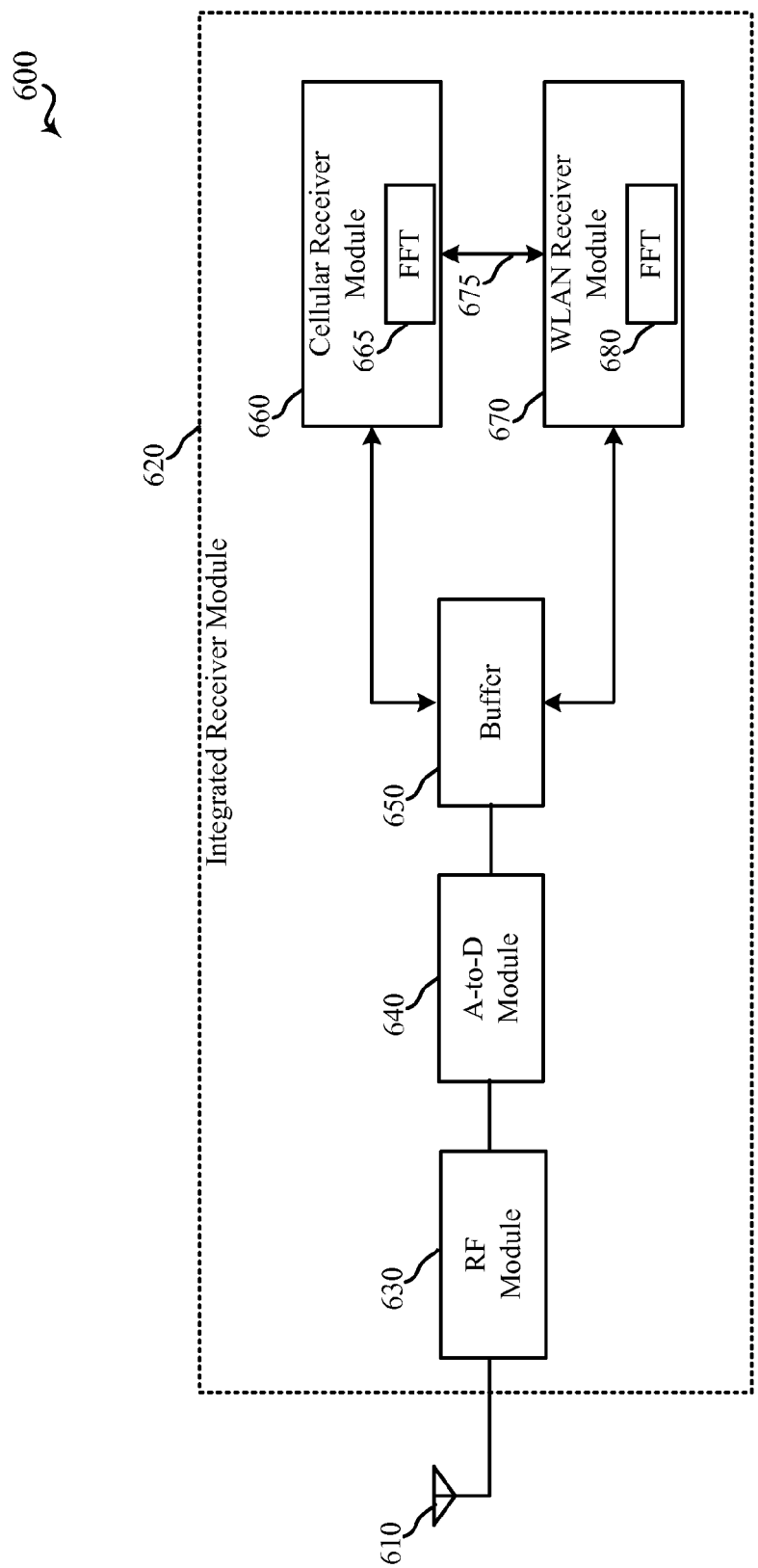
FIG. 6 shows a block diagram of an example of an integrated receiver module according to various examples.

FIG. 6 illustrates a block diagram 600 of an integrated receiver module 620 for use in wireless communications in accordance with various examples. In some examples, the integrated receiver module 620 may be used in any or each of the cellular devices described with reference to FIGS. 1, 2, and/or 3, such as the eNBs 105, 205, and/or 305 or the UEs 115, 215, and/or 315. The integrated receiver module 620 may include an antenna 610, radio frequency (RF) module 630, A-to-D module 640, buffer 650, cellular receiver module 660, and/or WLAN receiver module 670. Each of these components may be in communication with each other.

The components of the integrated receiver module 620 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one configuration, the RF module 630 may receive multiple signals over a wireless channel (or bandwidth) of an unlicensed radio frequency spectrum band and perform analog filtering, or some other analog signal processing operation, of the received signals. Following this filtering, the collection of received signals may be converted to a digital signal (e.g., a plurality of digital samples) by the A-to-D module 640. The digital samples may be stored in the buffer 650.

In some examples, the multiple signals may include at least a WLAN signal and a cellular signal. The WLAN receiver module 670 may access the stored digital samples from the buffer 650 to reconstruct at least a portion of the WLAN signal. In some cases, the WLAN receiver module 670 may be configured to perform the reconstruction without being associated with an access point that transmitted the WLAN signal. Upon reconstructing at least the portion of the WLAN signal, the WLAN receiver module 670 may remove the reconstructed portion of the WLAN signal from the stored digital samples in the buffer 650 and notify the cellular receiver module 660 via link 675. The cellular receiver module 660 may then convert the contents of the buffer 650 to the frequency domain (e.g., using the FFT module 665) for demodulation and decoding of the cellular signal. The WLAN receiver module 670 may in some cases convert the reconstructed WLAN signal to the frequency domain (e.g., using the FFT module 680).

In some examples, the WLAN receiver module 670 may access the stored digital samples from the buffer 650 and determine whether to apply codeword-level interference cancelation (CWIC) or symbol-level interference cancelation (SLIC) to remove an interference signal (e.g., a WLAN signal) in the multiple signals. The determination to apply CWIC or SLIC may be based at least in part on whether the interference signal is within a desired signal window or a supported bandwidth for a cellular signal in the plurality of signals. The application of CWIC or SLIC may correspond to the removal of the interference signal (e.g., WLAN signal) from the contents of the buffer 650.

In some examples, the multiple signals may include at least a cellular signal and an interference signal (e.g., a WLAN signal). The WLAN receiver module 670 may access the stored digital samples from the buffer 650 to identify a duration of the interference signal from a preamble of the interference signal. The WLAN receiver module 670 may then notify the cellular receiver module 660 of the duration, and the cellular receiver module 660 may adapt its configuration and/or operation based at least in part on the duration of the interference signal. Thereafter, the cellular receiver module 660 may convert the contents of the buffer 650 to the frequency domain (e.g., using the FFT module 665) for demodulation and decoding of the cellular signal.

Figure 7A:
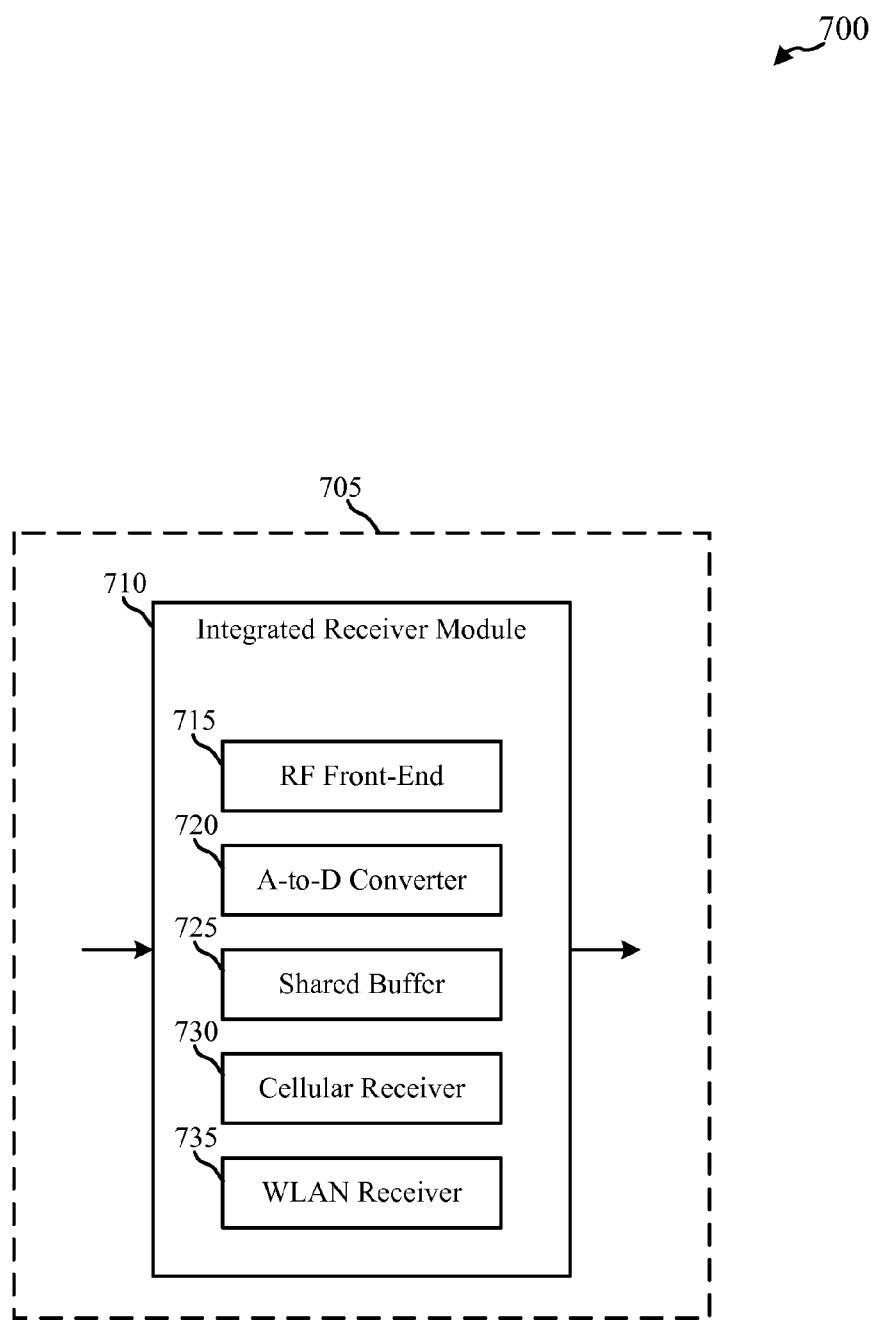
FIG. 7A shows a block diagram of an example of a device having an integrated receiver according to various examples.

Referring now to FIG. 7A, a block diagram 700 illustrates a device 705 for use in wireless communications in accordance with various examples. In some examples, the device 705 may be an example of one or more aspects of the eNBs 105, 205, and/or 305 described with reference to FIGS. 1, 2, and/or 3. In other examples, the device 705 may be an example of one or more aspects of the UEs 115, 215, and/or 315 described with reference to FIGS. 1, 2, and/or 3. The device 705 may also be a processor. The device 705 may include an integrated receiver module 710.

The integrated receiver module 710 may in some cases be an example of one or more aspects of the integrated receiver module 620 described with reference to FIG. 6, and may include an RF front-end 715, an A-to-D converter 720, a shared buffer 725, a cellular receiver 730, and/or an WLAN receiver 735. Each of these components may be in communication with each other.

The components of the integrated receiver module 710 may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In one configuration, the RF module 715 may receive multiple signals over a wireless channel (or bandwidth) of an unlicensed radio frequency spectrum band and perform analog filtering, or some other analog signal processing operation, of the received signals. Following this filtering, the collection of received signals may be converted to a digital signal (e.g., a plurality of digital samples) by the A-to-D converter 720. The digital samples may be stored in the shared buffer 725.

In some examples, the multiple signals may include at least a WLAN signal and a cellular signal. The WLAN receiver 735 may access the stored digital samples from the shared buffer 725 to reconstruct at least a portion of the WLAN signal. In some cases, the WLAN receiver 735 may be configured to perform the reconstruction without being associated with an access point that transmitted the WLAN signal. Upon reconstructing at least the portion of the WLAN signal, the WLAN receiver 735 may remove the reconstructed portion of the WLAN signal from the stored digital samples in the shared buffer 725 and notify the cellular receiver 730. The cellular receiver 730 may then convert the contents of the shared buffer 725 to the frequency domain for demodulation and decoding of the cellular signal.

In some examples, the WLAN receiver 735 may access the stored digital samples from the shared buffer 725 and determine whether to apply CWIC or SLIC to remove an interference signal (e.g., a WLAN signal) in the multiple signals. The determination to apply CWIC or SLIC may be based at least in part on whether the interference signal is within a desired signal window or a supported bandwidth for a cellular signal in the plurality of signals.

In some examples, the multiple signals may include at least a cellular signal and an interference signal (e.g., a WLAN signal). The WLAN receiver 735 may access the stored digital samples from the shared buffer 725 to identify a duration of the interference signal from a preamble of the interference signal. The WLAN receiver 735 may then notify the cellular receiver 730 of the duration, and the cellular receiver 730 may adapt its configuration based at least in part on the duration of the interference signal. Thereafter, the cellular receiver 730 may convert the contents of the shared buffer 725 to the frequency domain for demodulation and decoding of the cellular signal.

Figure 7B:
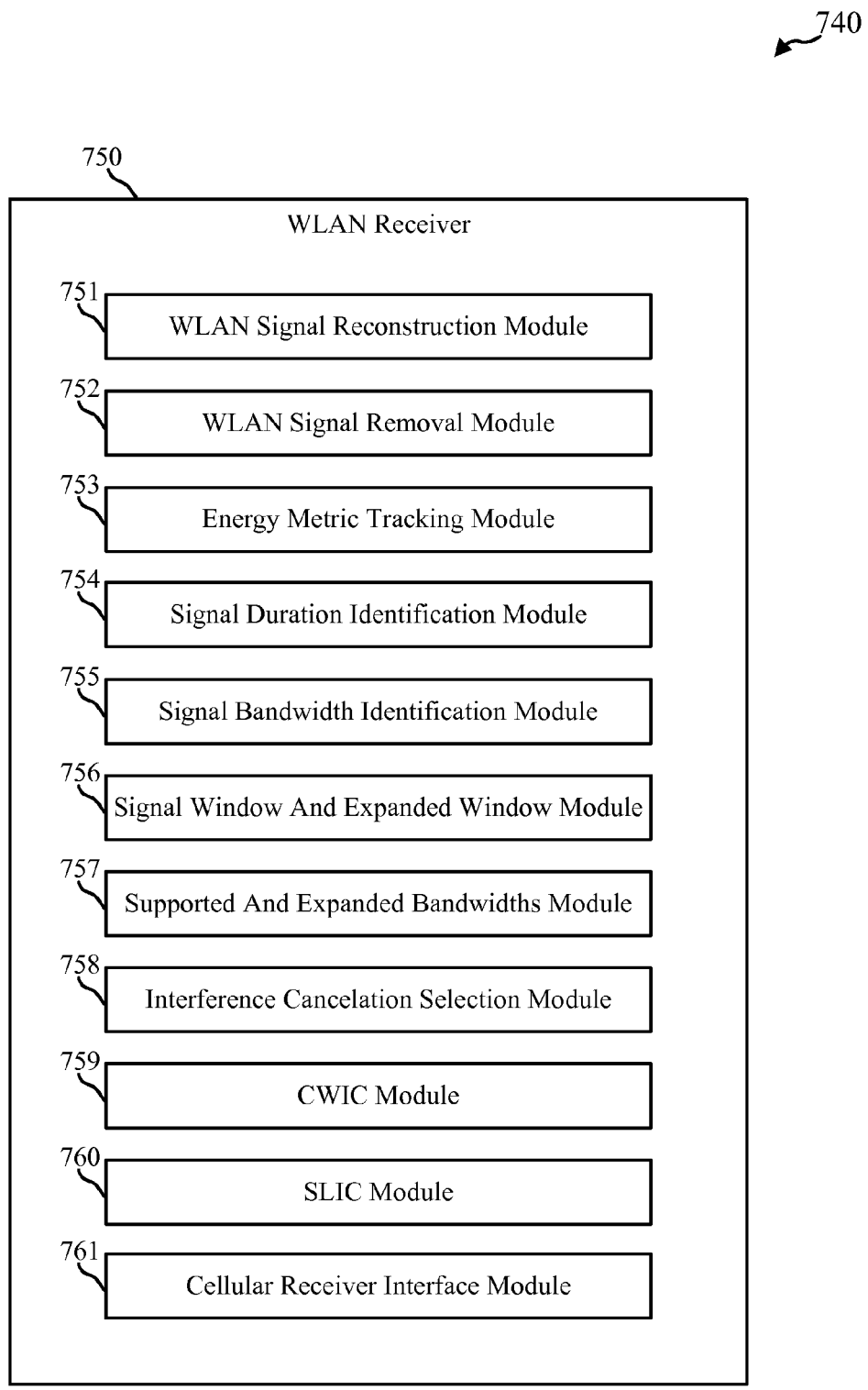
FIG. 7B shows a block diagram of an example of an unlicensed radio frequency spectrum band WLAN receiver according to various examples.

Referring now to FIG. 7B, a block diagram 740 illustrates an example of an WLAN receiver 750 for use in wireless communications in accordance with various examples. In some examples, the WLAN receiver 750 may be an example of one or more aspects of the WLAN receiver module 670 and/or WLAN receiver 735 described with reference to FIGS. 6 and/or 7A. The WLAN receiver 750 may include a WLAN signal reconstruction module 751, a WLAN signal removal module 752, an energy metric tracking module 753, a signal duration identification module 754, a signal bandwidth identification module 755, a signal window and expanded window module 756, a supported and expanded bandwidths module 757, an interference cancelation selection module 758, a CWIC module 759, a SLIC module 760, and/or a cellular receiver interface module 761.

The components of the WLAN receive 750 may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In one configuration, the WLAN signal reconstruction module 751 may be used to reconstruct at least a portion of a WLAN signal from stored digital samples. When the WLAN signal is entirely within the duration of a signal window or bandwidth of an expected cellular signal, or when an expanded window or expanded bandwidth analysis is invoked using the module 757 and/or 758, the entirety of a WLAN signal may be reconstructed. The WLAN signal, or a portion thereof, may in some cases be reconstructed by detecting a WLAN preamble from the stored digital samples, decoding the WLAN preamble to identify modulation and encoding information for a WLAN payload, and demodulating at least a portion of the WLAN payload based at least in part on the modulation and encoding information. In some cases, the WLAN signal, or a portion thereof, may be reconstructed after identifying a duration of a cellular signal in the multiple signals received, and reconstructing the portion of the WLAN signal that has the same duration as the duration of the cellular signal.

In one configuration, the WLAN signal removal module 752 may be used to remove the reconstructed portion of the WLAN signal from the stored digital samples. The removal may include or involve the application or use of CWIC or SLIC, for example.

In one configuration, the energy metric tracking module 753 may track a metric corresponding to an energy the received signals, and reconstruct at least a portion of a WLAN signal until the metric being tracked breaches a threshold value. In this manner, battery life of a device may be extended by not reconstructing and removing a received WLAN signal or other interference signal from the received signals, unless the WLAN signal or other interference signal is believed to present an interference issue.

In one configuration, the signal duration identification module 754 may be used to identify a duration of an interference signal from the preamble of the interference signal. The duration may then be communicated to a cellular receiver (e.g., cellular receiver 730) for purposes of adapting the receiver prior to demodulation and decoding of a cellular signal. The duration may also be used by the interference cancelation selection module 758 to determine whether an interference signal is within a desired signal window, thereby enabling the application of CWIC or SLIC to remove the interference signal from a plurality of received signals.

In one configuration, the signal bandwidth identification module 755 may determine whether a WLAN signal or other interference signal is within, partly within, or outside the bandwidth of a cellular signal. This determination may be used by the interference cancelation selection module 758 to determine whether an interference signal is within a supported bandwidth, thereby enabling the application of CWIC or SLIC to remove the interference signal from a plurality of received signals.

In one configuration, the signal window and expanded window module 756 may determine whether the portion of an interference signal included within a signal window of a received cellular signal will be reconstructed, or whether a portion of the interference signal falling outside the signal window of the received cellular signal will also be reconstructed (e.g., using an expanded window for purposes of reconstruction).

In one configuration, the supported and expanded bandwidths module 757 may determine whether the portion of an interference signal included within the bandwidth of a received cellular signal will be reconstructed, or whether a portion of the interference signal falling outside the bandwidth of the received cellular signal will also be reconstructed (e.g., using an expanded bandwidth for purposes of reconstruction).

In one configuration, the interference cancelation selection module 758 may determine whether to apply CWIC or SLIC to remove an interference signal the received signals. The determination may be based at least in part on whether the interference signal is within a desired signal window or a supported bandwidth for a cellular signal in the plurality of signals, as determined by the signal duration identification module 754 and/or the signal bandwidth identification module 755. When the portion of the interference signal within the desired signal window and/or the supported bandwidth is reconstructed, and when a determination is made that the interference signal is at least partly outside the desired signal window and/or at least partly outside the supported bandwidth, SLIC may be applied to remove the interference signal. When the portion of the interference signal within the desired signal and/or the supported bandwidth is reconstructed, and when a determination is made that the interference signal is within the desired signal window or within the desired bandwidth, CWIC may be applied to remove the interference signal (though SLIC, albeit less robust, could also be applied). When a determination is made that the interference signal is outside the supported bandwidth and/or outside the desired signal window, and when the interference signal is reconstructed using an expanded signal window and/or expanded bandwidth, CWIC may be applied to remove the interference signal (though SLIC may also be applied).

In one configuration, the CWIC module 759 may apply CWIC to remove an interference signal in the received signals. The CWIC module 759 may be activated by the interference cancelation selection module 758.

In one configuration, the SLIC module 760 may apply SLIC to remove an interference signal in a plurality of received signals. The SLIC module 760 may be activated by the interference cancelation selection module 758.

In one configuration, the cellular receiver interface module 761 may communicate signals to or from an cellular receiver, such as the cellular receiver or receiver module 660, 730 and/or 780 described with reference to FIGS. 6, 7A, and/or 7C.

Figure 7C:
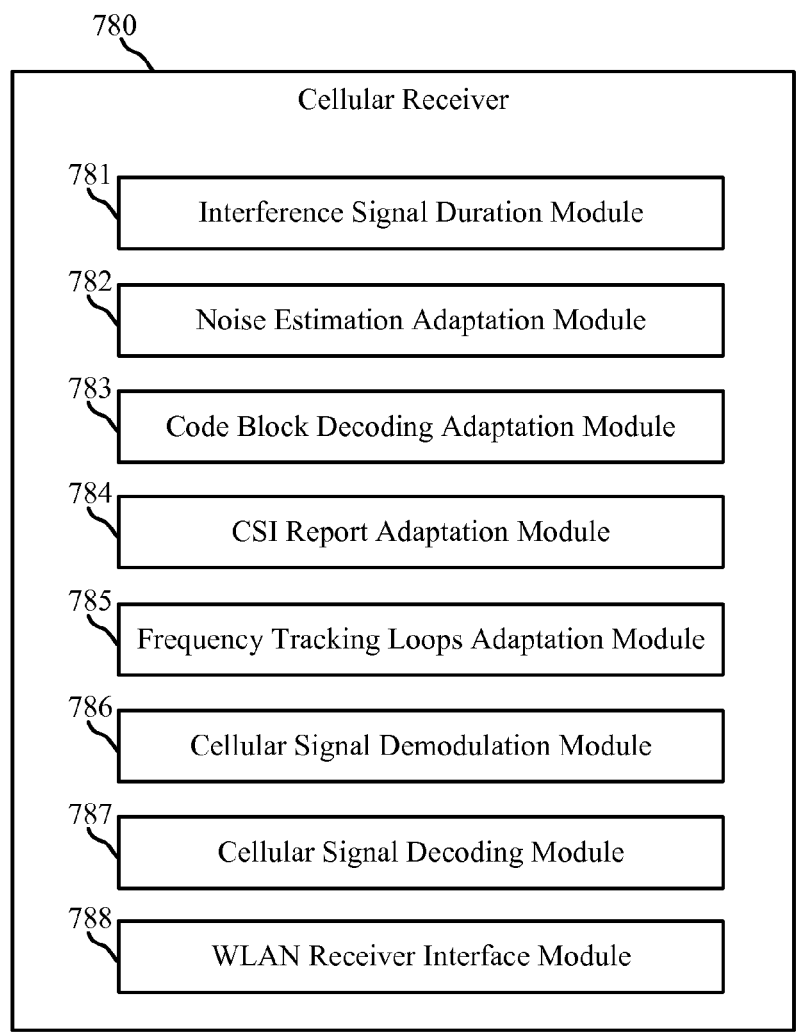
FIG. 7C shows a block diagram of an example of a cellular receiver according to various examples.

Referring now to FIG. 7C, a block diagram 770 illustrates an example of a cellular receiver 780 for use in an integrated receiver module in accordance with various examples. In some examples, the cellular receiver 780 may be an example of one or more aspects of the cellular receiver module 660 and/or cellular receiver 730 described with reference to FIGS. 6 and/or 7A. The cellular receiver 780 may include an interference signal duration module 781, a noise estimation adaptation module 782, a code block decoding adaptation module 783, a channel state information (CSI) report adaptation module 784, a frequency tracking loops adaptation module 785, a cellular signal demodulation module 786, a cellular signal decoding module 787, and/or an WLAN receiver interface module 788.

The components of the cellular receiver 780 may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In one configuration, the interference signal duration module 781 may receive a duration of an interference signal (e.g., a WLAN signal) from an WLAN receiver such as the WLAN receiver or receiver module 670, 735, and/or 750 described with reference to FIGS. 6, 7A, and/or 7B.

In one configuration, the noise estimation adaptation module 782 may apply a first noise estimation technique to a received cellular signal during an interference signal, and apply a second noise estimation technique to the received cellular signal outside the duration of the interference signal, as determined by duration received by the interference signal duration module 781.

In one configuration, the noise estimation adaptation module 782 may apply a first noise estimation resolution to a received cellular signal during an interference signal, and apply a second noise estimation resolution to the received cellular signal outside the duration of the interference signal, as determined by duration received by the interference signal duration module 781.

In one configuration, the code block decoding adaptation module 783 may identify code blocks in a received cellular signal that occur during the interference signal, and decode the identified code blocks before decoding any remaining code blocks in the cellular signal that occur outside the duration of the interference signal.

In one configuration, the CSI report adaptation module 784 may remove, from a CSI report, information about the interference signal when the duration of the interference signal is less than a threshold value.

In one configuration, the frequency tracking loops adaptation module 785 may use a WiFi signal (or information about a WiFi signal provided by a WLAN receiver) during an OFF period of unlicensed radio frequency spectrum band transmissions to perform LTE tracking loops such as frequency tracking loops.

In one configuration, the cellular signal demodulation module 786 may be used to demodulate a received cellular signal (possibly after adapting the cellular receiver 780 using the modules 781, 782, 783, 784, and/or 785).

In one configuration, the cellular signal decoding module 787 may be used to decode a received cellular signal (possibly after adapting the cellular receiver 780 using the modules 781, 782, 783, 784, and/or 785).

In one configuration, the WLAN receiver interface module 788 may communicate signals to or from an WLAN receiver, such as the WLAN receiver or receiver module 670, 735 and/or 750 described with reference to FIGS. 6, 7A, and/or 7B.

Figure 8:
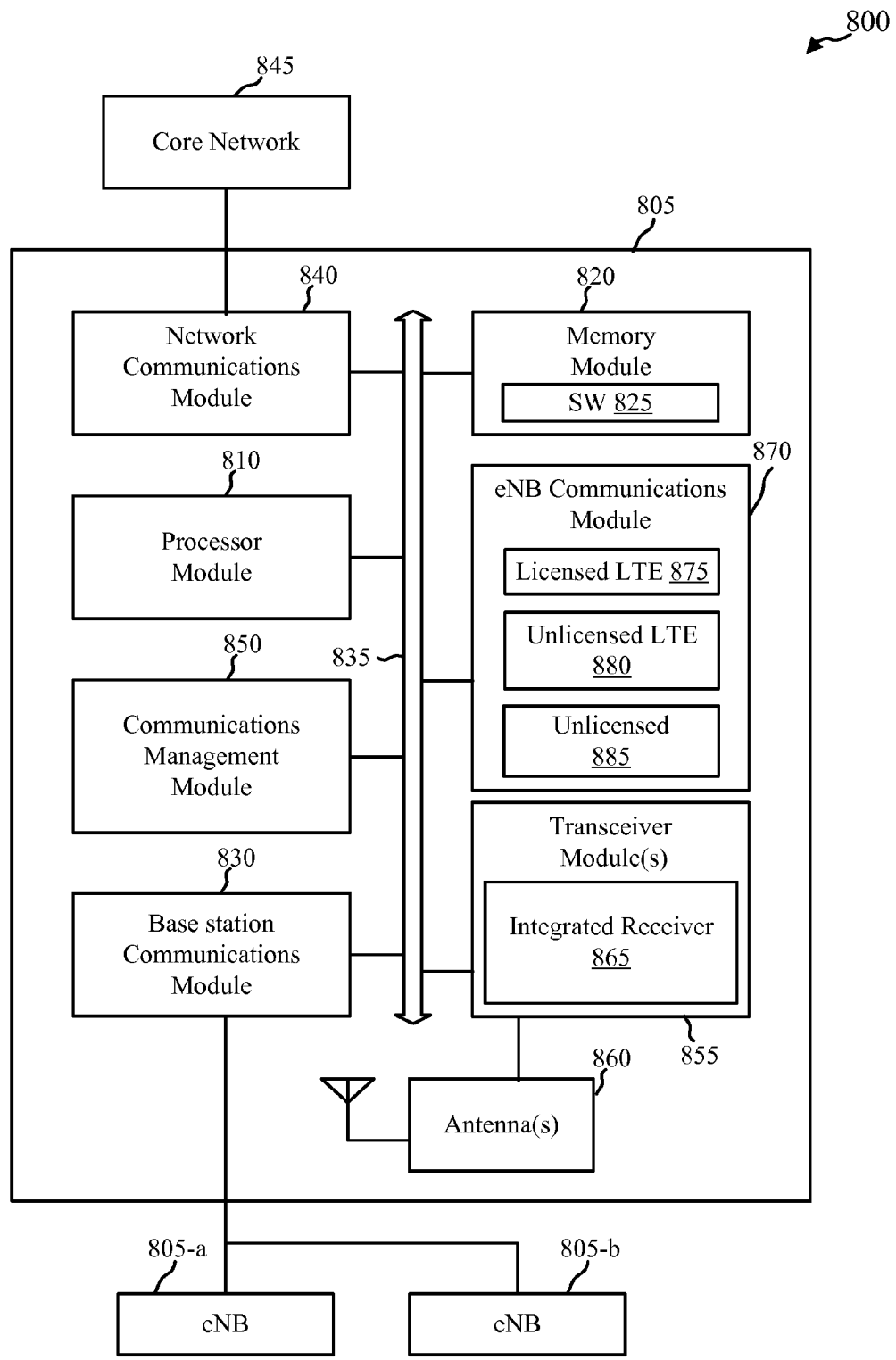
FIG. 8 shows a block diagram that illustrates an example of an eNB architecture according to various examples.

Turning to FIG. 8, a block diagram 800 is shown that illustrates an eNB 805 configured for an unlicensed radio frequency spectrum band. In some examples, the eNB 805 may be an example of one or more aspects of the eNBs or devices 105, 205, 305, and/or 705 described with reference to FIGS. 1, 2, 3, and/or 7A. The eNB 805 may be configured to implement at least some of the integrated receiver features and functions described with reference to FIGS. 6, 7A, 7B, and/or 7C. The eNB 805 may include a processor module 810, a memory module 820, at least one transceiver module (represented by transceiver module(s) 855), at least one antenna (represented by antenna(s) 860), and/or an eNB communications module 870. The eNB 805 may also include one or both of a base station communications module 830 and a network communications module 840. Each of these components may be in communication with each other, directly or indirectly, over one or more buses 835.

The memory module 820 may include random access memory (RAM) and/or read-only memory (ROM). The memory module 820 may store computer-readable, computer-executable software (SW) code 825 containing instructions that are configured to, when executed, cause the processor module 810 to perform various functions described herein for receiving and using LTE-based communications in a licensed and/or unlicensed radio frequency spectrum band, including the removal of an interference signal from a cellular signal. Alternatively, the software code 825 may not be directly executable by the processor module 810 but be configured to cause the eNB 805, e.g., when compiled and executed, to perform various of the functions described herein.

The processor module 810 may include an intelligent hardware device, e.g., a central processing unit (CPU), a microcontroller, an ASIC, etc. The processor module 810 may process information received through the transceiver module(s) 855, the base station communications module 830, and/or the network communications module 840. The processor module 810 may also process information to be sent to the transceiver module(s) 855 for transmission through the antenna(s) 860, to the base station communications module 830 for transmission to one or more other base stations or eNBs 805-*a* and 805-*b*, and/or to the network communications module 840 for transmission to a core network 845, which may be an example of aspects of the core network 130 described with reference to FIGS. 1 and/or 3A. The processor module 810 may handle, alone or in connection with the eNB communications module 870, various aspects of receiving and using LTE-based communications in a licensed and/or unlicensed radio frequency spectrum band, including the removal of an interference signal from a cellular signal.

The transceiver module(s) 855 may include a modem configured to modulate the packets and provide the modulated packets to the antenna(s) 860 for transmission, and to demodulate packets received from the antenna(s) 860. The transceiver module(s) 855 may be implemented as one or more transmitter modules and one or more separate receiver modules. The transceiver module(s) 855 may support communications in at least one licensed radio frequency spectrum band (e.g., an LTE spectrum) and in at least one unlicensed radio frequency spectrum band. The transceiver module(s) 855 may be configured to communicate bi-directionally, via the antenna(s) 860, with one or more of the UEs 115, 215, and/or 315 described with reference to FIGS. 1, 2, and/or 3, for example. The transceiver module(s) 855 may include or implement an integrated receiver module 865 configured to perform, for example, some or all of the integrated receiver features or functions described with reference to FIGS. 6, 7A, 7B, and/or 7C. In some cases, the operation of one or more aspects of the integrated receiver module 865 may be coordinated by the processor module 810.

The eNB 805 may typically include multiple antennas 860 (e.g., an antenna array). The eNB 805 may communicate with the core network 845 through the network communications module 840. The core network 845 may an example of one or more aspects of the core network 130 described with reference to FIG. 1. The eNB 805 may communicate with other base stations or eNBs, such as the eNBs 805-*a* and 805-*b*, using the base station communications module 830.

According to the architecture of FIG. 8, the eNB 805 may further include a communications management module 850. The communications management module 850 may manage communications with other base stations, eNBs, and/or devices. The communications management module 850 may be in communication with some or all of the other components of the eNB 805 via the bus or buses 835. Alternatively, functionality of the communications management module 850 may be implemented as a component of the transceiver module(s) 855, as a computer program product, and/or as one or more controller elements of the processor module 810.

The eNB communications module 870 may be configured to perform and/or control some or all of the licensed and unlicensed radio frequency spectrum band functions or aspects described with reference to FIGS. 1, 2, 3, 6, 7A, 7B, and/or 7C related to receiving and using LTE-based communications in a licensed and/or unlicensed radio frequency spectrum band. For example, the eNB communications module 870 may be configured to support a supplemental downlink mode, a carrier aggregation mode, and/or a standalone mode. The eNB communications module 870 may include a licensed LTE module 875 configured to handle LTE communications over a licensed radio frequency spectrum band, an unlicensed LTE module 880 configured to handle LTE communications over an unlicensed radio frequency spectrum band, and/or an unlicensed module 885 configured to handle communications other than LTE over an unlicensed radio frequency spectrum band. The eNB communications module 870, or portions of it, may include a processor and/or some or all of the functionality of the eNB communications module 870 may be performed by the processor module 810 and/or in connection with the processor module 810.

Figure 9:
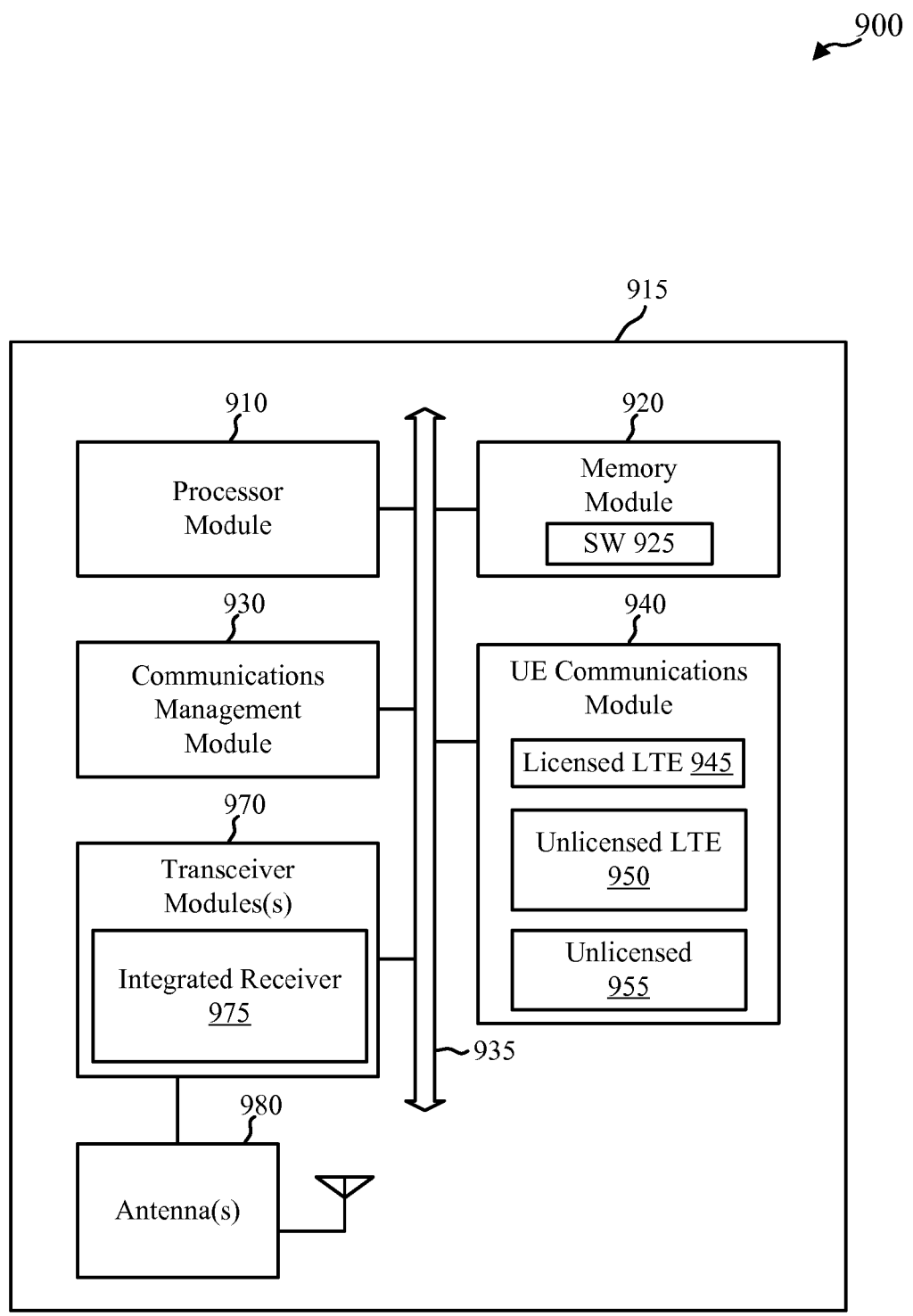
FIG. 9 shows a block diagram that illustrates an example of a UE architecture according to various examples.

Turning to FIG. 9, a block diagram 900 is shown that illustrates a UE 915 configured for an unlicensed radio frequency spectrum band. The UE 915 may have various configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The UE 915 may have an internal power supply (not shown), such as a small battery, to facilitate mobile operation. In some examples, the UE 915 may be an example of one or more aspects of the UEs or devices 115, 215, 315, and/or 705 described with reference to FIGS. 1, 2, 3, and/or 7A. The UE 915 may be configured to implement at least some of the integrated receiver features and functions described with reference to FIGS. 6, 7A, 7B, and/or 7C. The UE 915 may also be configured to communicate with one or more of the eNBs or devices 105, 205, 305, and/or 705 described with reference to FIGS. 1, 2, 3, and/or 7A.

The UE 915 may include a processor module 910, a memory module 920, at least one transceiver module (represented by transceiver module(s) 970), at least one antenna (represented by antenna(s) 980), and/or a UE communications module 940. Each of these components may be in communication with each other, directly or indirectly, over one or more buses 935.

The memory module 920 may include RAM and/or ROM. The memory module 920 may store computer-readable, computer-executable software (SW) code 925 containing instructions that are configured to, when executed, cause the processor module 910 to perform various functions described herein for receiving and using LTE-based communications in a licensed and/or unlicensed radio frequency spectrum band, including the removal of an interference signal from a cellular signal. Alternatively, the software code 925 may not be directly executable by the processor module 910 but be configured to cause the UE 915 (e.g., when compiled and executed) to perform various of the UE functions described herein.

The processor module 910 may include an intelligent hardware device, e.g., a CPU, a microcontroller, an ASIC, etc. The processor module 910 may process information received through the transceiver module(s) 970 and/or information to be sent to the transceiver module(s) 970 for transmission through the antenna(s) 980. The processor module 910 may handle, alone or in connection with the UE communications module 940, various aspects of receiving and using LTE-based communications in a licensed and/or unlicensed radio frequency spectrum band.

The transceiver module(s) 970 may be configured to communicate bi-directionally with eNBs. The transceiver module(s) 970 may be implemented as one or more transmitter modules and one or more separate receiver modules. The transceiver module(s) 970 may support communications in at least one licensed radio frequency spectrum band (e.g., an LTE spectrum) and in at least one unlicensed radio frequency spectrum band. The transceiver module(s) 970 may include a modem configured to modulate the packets and provide the modulated packets to the antenna(s) 980 for transmission, and to demodulate packets received from the antenna(s) 980. While the UE 915 may include a single antenna, there may be examples in which the UE 915 may include multiple antennas 980.

The transceiver module(s) 970 may further include or implement an integrated receiver module 975 configured to perform, for example, some or all of the integrated receiver features or functions described with reference to FIGS. 6, 7A, 7B, and/or 7C. In some cases, the operation of one or more aspects of the integrated receiver module 975 may be coordinated by the processor module 910.

According to the architecture of FIG. 9, the UE 915 may further include a communications management module 930. The communications management module 930 may manage communications with various base stations or eNBs. The communications management module 930 may be a component of the UE 915 in communication with some or all of the other components of the UE 915 over the one or more buses 935. Alternatively, functionality of the communications management module 930 may be implemented as a component of the transceiver module(s) 970, as a computer program product, and/or as one or more controller elements of the processor module 910.

The UE communications module 940 may be configured to perform and/or control some or all of the UE unlicensed radio frequency spectrum band functions or aspects described in FIGS. 1, 2, 3, 6, 7A, 7B, and/or 7C related to receiving and using LTE-based communications in a licensed and/or unlicensed radio frequency spectrum band. For example, the UE communications module 940 may be configured to support a supplemental downlink mode, a carrier aggregation mode, and/or a standalone mode. The UE communications band module 940 may include a licensed LTE module 945 configured to handle LTE communications over a licensed radio frequency spectrum band, an unlicensed LTE module 950 configured to handle communications over an unlicensed radio frequency spectrum band, and/or an unlicensed module 955 configured to handle communications other than LTE over an unlicensed radio frequency spectrum band. The UE communications module 940, or portions of it, may include a processor and/or some or all of the functionality of the UE communications module 940 may be performed by the processor module 910 and/or in connection with the processor module 910.

Figure 10:
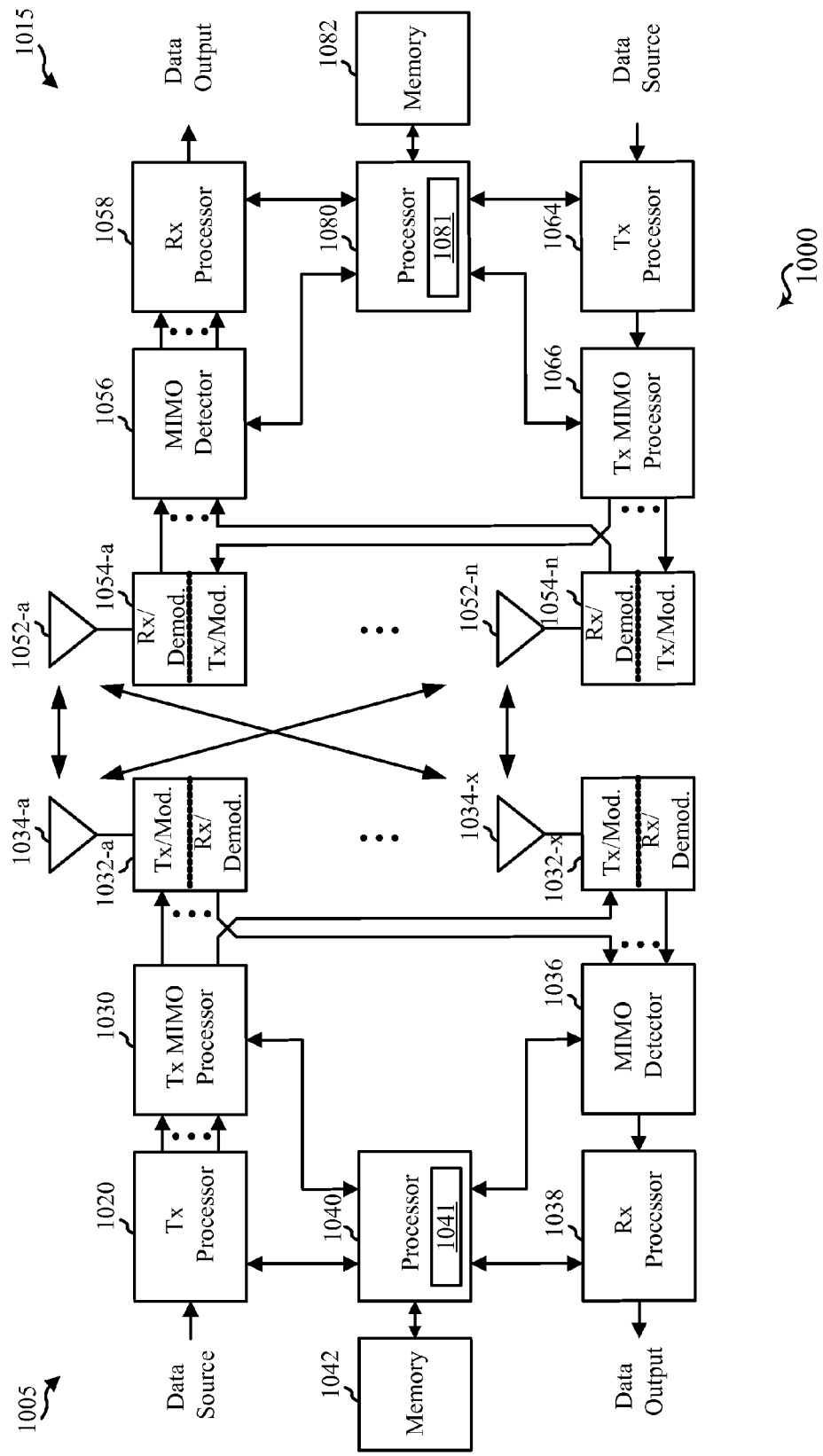
FIG. 10 shows a block diagram that illustrates an example of a multiple-input multiple-output (MIMO) communications system according to various examples.

Turning next to FIG. 10, a block diagram of a multiple-input multiple-output (MIMO) communication system 1000 is shown including an eNB 1005 and a UE 1015. The eNB 1005 and the UE 1015 may support LTE-based communications using a licensed and/or unlicensed radio frequency spectrum band. The eNB 1005 may be an example of one or more aspects of the eNBs or devices 105, 205, 305, 705, and/or 805 described with reference to FIGS. 1, 2, 3A, 3B, 7A, and/or 8, while the UE 1015 may be an example of one or more aspects of the UEs or devices 115, 215, 315, 705, and/or 905 described with reference to FIGS. 1, 2, 3, 7, and/or 9. The system 1000 may illustrate aspects of the wireless communications system 100, 200, 300, and/or 330 described with reference to FIGS. 1, 2, 3A, and/or 3B.

The eNB 1005 may be equipped with antennas 1034-*a* through 1034-*x*, and the UE 1015 may be equipped with antennas 1052-*a* through 1052-*n*. In the system 1000, the eNB 1005 may be able to send data over multiple communication links at the same time. Each communication link may be called a "layer" and the "rank" of the communication link may indicate the number of layers used for communication. For example, in a 2×2 MIMO system where eNB 1005 transmits two "layers," the rank of the communication link between the eNB 1005 and the UE 1015 may be two.

At the eNB 1005, a transmit (Tx) processor 1020 may receive data from a data source. The transmit processor 1020 may process the data. The transmit processor 1020 may also generate reference symbols and/or a cell-specific reference signal. A transmit (Tx) MIMO processor 1030 may perform spatial processing (e.g., precoding) on data symbols, control symbols, and/or reference symbols, if applicable, and may provide output symbol streams to the transmit (Tx) modulators 1032-*a* through 1032-*x*. Each modulator 1032 may process a respective output symbol stream (e.g., for OFDM, etc.) to obtain an output sample stream. Each modulator 1032 may further process (e.g., convert to analog, amplify, filter, and upconvert) the output sample stream to obtain a downlink (DL) signal. In one example, DL signals from modulators 1032-*a* through 1032-*x* may be transmitted via the antennas 1034-*a* through 1034-*x*, respectively.

At the UE 1015, the antennas 1052-*a* through 1052-*n* may receive the DL signals from the eNB 1005 and may provide the received signals to the receive (Rx) demodulators 1054-*a* through 1054-*n*, respectively. Each demodulator 1054 may condition (e.g., filter, amplify, downconvert, and digitize) a respective received signal to obtain input samples. Each demodulator 1054 may further process the input samples (e.g., for OFDM, etc.) to obtain received symbols. A MIMO detector 1056 may obtain received symbols from all the demodulators 1054-*a* through 1054-*n*, perform MIMO detection on the received symbols if applicable, and provide detected symbols. A receive (Rx) processor 1058 may process (e.g., demodulate, deinterleave, and decode) the detected symbols, providing decoded data for the UE 1015 to a data output, and provide decoded control information to a processor 1080, or memory 1082. The processor 1080 may include or be associated with a module or function 1081 used in performing or coordinating various functions related to interference cancelation when receiving LTE-based communications in a licensed and/or unlicensed radio frequency spectrum band. For example, the module or function 1081 may perform or coordinate some or all of the functions of the integrated receiver module 620, 710, 865, and/or 975 described with reference to FIGS. 6, 7A, 8, and/or 9.

On the uplink (UL), at the UE 1015, a transmit (Tx) processor 1064 may receive and process data from a data source. The transmit processor 1064 may also generate reference symbols for a reference signal. The symbols from the transmit processor 1064 may be precoded by a transmit (Tx) MIMO processor 1066 if applicable, further processed by the transmit (Tx) modulators 1054-*a* through 1054-*n* (e.g., for SC-FDMA, etc.), and be transmitted to the eNB 1005 in accordance with the transmission parameters received from the eNB 1005. At the eNB 1005, the UL signals from the UE 1015 may be received by the antennas 1034, processed by the receiver (Rx) demodulators 1032, detected by a MIMO detector 1036 if applicable, and further processed by a receive (Rx) processor 1038. The receive processor 1038 may provide decoded data to a data output and to the processor 1040. The processor 1040 may include or be associated with a module or function 1041 used in performing or coordinating various functions related to interference cancelation when receiving LTE-based communications in a licensed and/or unlicensed radio frequency spectrum band. For example, the module or function 1041 may perform or coordinate some or all of the functions of the integrated receiver module 620, 710, 865, and/or 975 described with reference to FIGS. 6, 7A, 8, and/or 9.

The components of the eNB 1005 may, individually or collectively, be implemented with one or more ASICs adapted to perform some or all of the applicable functions in hardware. Each of the noted modules may be a means for performing one or more functions related to operation of the system 1000. Similarly, the components of the UE 1015 may, individually or collectively, be implemented with one or more ASICs adapted to perform some or all of the applicable functions in hardware. Each of the noted components may be a means for performing one or more functions related to operation of the system 1000.

Figure 11:
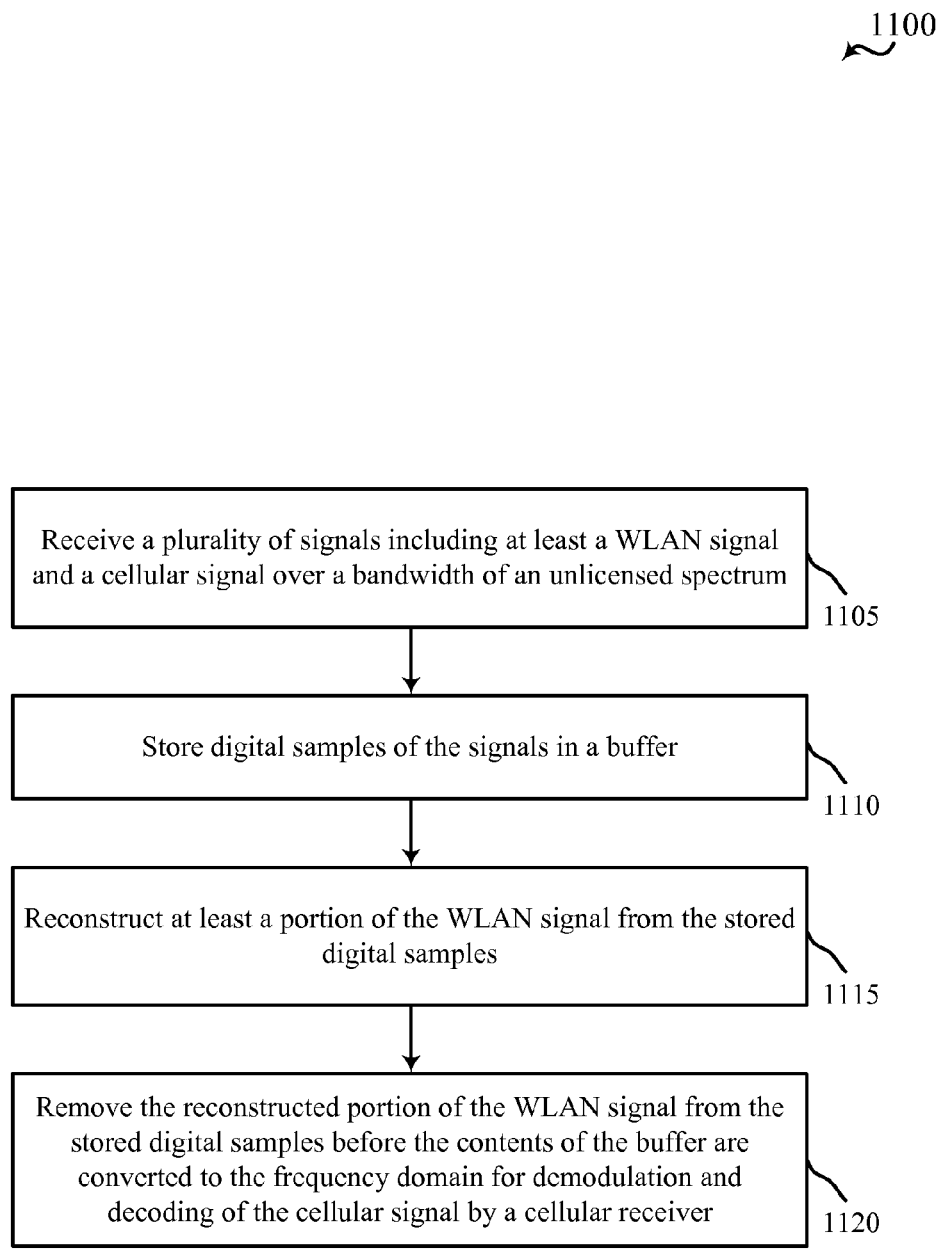
FIGS. 11 and 12 are flowcharts of example methods for wireless communications using an unlicensed radio frequency spectrum band (e.g., methods for removing a reconstructed portion of a WLAN signal from stored digital samples of multiple received signals) according to various examples.

FIG. 11 is a flow chart illustrating an example of a method 1100 for wireless communications. For clarity, the method 1100 is described below with reference to one of the eNBs or devices 105, 205, 305, 705, 805, and/or 1005 described with reference to FIGS. 1, 2, 3, 7A, 8, and/or 10, or one of the UEs or devices 115, 215, 315, 705, 915, and/or 1015 described with reference to FIGS. 1, 2, 3, 7, 9, and/or 10, or one of the integrated receiver modules 620, 710, 865, and/or 975, described with reference to FIGS. 6, 7A, 8, and/or 9. In one example, an eNB, UE, or integrated receiver module may execute one or more sets of codes to control the functional elements of the eNB, UE, cellular receiver, and/or WLAN receiver to perform the functions described below.

At block 1105, a plurality of signals including at least a WLAN signal and a cellular signal may be received over a bandwidth of an unlicensed radio frequency spectrum. The operation(s) at block 1105 may in some cases be performed using the integrated receiver module 620, 710, 865, and/or 975 described with reference to FIGS. 6, 7A, 8, and/or 9, the RF module 630 and A-to-D module 640 described with reference to FIG. 6, the RF front-end 715 and A-to-D converter 720 described with reference to FIG. 7A, and/or the Rx demodulators 1032-*a* through 1032-*x* or 1054-*a* through 1054-*x* described with reference to FIG. 10.

At block 1110, digital samples of the plurality of signals may be stored in a buffer. The operation(s) at block 1110 may in some cases be performed using the integrated receiver module 620, 710, 865, and/or 975 described with reference to FIGS. 6, 7A, 8, and/or 9, the buffer 650 described with reference to FIG. 6, the shared buffer 725 described with reference to FIG. 7A, and/or the module or function 1041 or 1081 described with reference to FIG. 10.

At block 1115, at least a portion of the WLAN signal may be reconstructed from the stored digital samples. In some cases, reconstructing at least a portion of the WLAN signal may include identifying a duration of a cellular signal in the plurality of signals, and reconstructing at least the portion of the WLAN signal such that the reconstructed portion of the WLAN signal has the same duration as the duration of the cellular signal. In the same or other cases, reconstructing at least a portion of the WLAN signal may include identifying a bandwidth of a cellular signal in the plurality of signals, and reconstructing at least the portion of the WLAN signal such that the reconstructed portion of the WLAN signal has the same bandwidth as the bandwidth of the cellular signal. Also in the same or other cases, reconstructing at least a portion of the WLAN signal may include tracking a metric corresponding to an energy of the plurality of signals, and reconstructing at least the portion of the WLAN signal until the metric being tracked breaches a threshold value. Breach of the threshold may indicate that a need for reconstructing the WLAN signal no longer exists, because, for example, interference caused by the WLAN signal no longer exists or is within an acceptable limit.

The at least a portion of the WLAN signal may in some cases be reconstructed by a WLAN receiver that accesses the stored digital samples from the buffer. The WLAN receiver may be configured to perform the reconstructing of the at least a portion of the WLAN signal without being associated with an access point that transmitted the WLAN signal. Thus, for example, the WLAN receiver may reconstruct at least a portion of a WLAN signal that was not intended for the WLAN receiver.

The operation(s) at block 1115 may in some cases be performed using the integrated receiver module 620, 710, 865, and/or 975 described with reference to FIGS. 6, 7A, 8, and/or 9, the WLAN receiver or WLAN receiver module 670, 735, and/or 750 described with reference to FIGS. 6, 7A, and/or 7B, and/or the module or function 1041 or 1081 described with reference to FIG. 10.

At block 1120, the reconstructed portion of the WLAN signal may be removed from the stored digital samples before the contents of the buffer are converted to the frequency domain for demodulation and decoding of the cellular signal by a cellular receiver (e.g., an LTE receiver). The operation(s) at block 1120 may in some cases be performed using the integrated receiver module 620, 710, 865, and/or 975 described with reference to FIGS. 6, 7A, 8, and/or 9, the cellular receiver or receiver module 660, 730, and/or 780 described with reference to FIGS. 6, 7A, and/or 7C, and/or the module or function 1041 or 1081 described with reference to FIG. 10.

Thus, the method 1100 may provide for wireless communications. It should be noted that the method 1100 is just one implementation and that the operations of the method 1100 may be rearranged or otherwise modified such that other implementations are possible.

Figure 12:
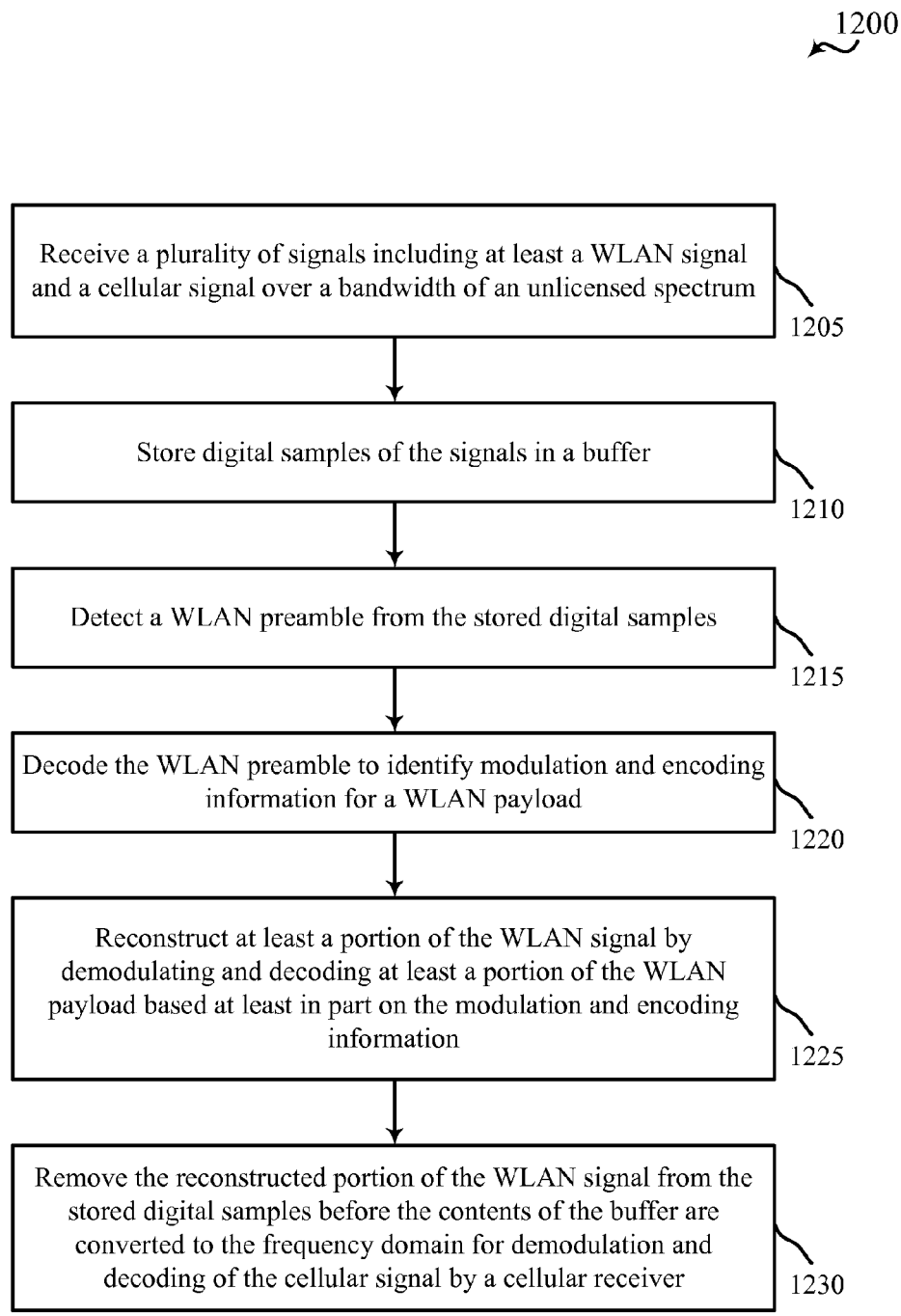

FIG. 12 is a flow chart illustrating an example of a method 1200 for wireless communications. For clarity, the method 1200 is described below with reference to one of the eNBs or devices 105, 205, 305, 705, 805, and/or 1005 described with reference to FIG. 1, 2, 3, 7A, 8, and/or 10, or one of the UEs or devices 115, 215, 315, 705, 915, and/or 1015 described with reference to FIGS. 1, 2, 3, 7, 9, and/or 10, or one of the integrated receiver modules 620, 710, 865, and/or 975, described with reference to FIGS. 6, 7A, 8, and/or 9. In one example, an eNB, UE, or receiver (including, for example, an integrated receiver module) may execute one or more sets of codes to control the functional elements of the eNB, UE, cellular receiver and/or WLAN receiver to perform the functions described below.

At block 1205, a plurality of signals including at least a WLAN signal and a cellular signal may be received over a bandwidth of an unlicensed radio frequency spectrum. The operation(s) at block 1205 may in some cases be performed using the integrated receiver module 620, 710, 865, and/or 975 described with reference to FIGS. 6, 7A, 8, and/or 9, the RF module 630 and A-to-D module 640 described with reference to FIG. 6, the RF front-end 715 and A-to-D converter 720 described with reference to FIG. 7A, and/or the Rx demodulators 1032-*a* through 1032-*x* or 1054-*a* through 1054-*x* described with reference to FIG. 10.

At block 1210, digital samples of the plurality of signals may be stored in a buffer. The operation(s) at block 1210 may in some cases be performed using the integrated receiver module 620, 710, 865, and/or 975 described with reference to FIGS. 6, 7A, 8, and/or 9, the buffer 650 described with reference to FIG. 6, the shared buffer 725 described with reference to FIG. 7A, and/or the module or function 1041 or 1081 described with reference to FIG. 10.

At block 1215, a WLAN preamble may be detected from the stored digital samples, and at block 1220, the WLAN preamble may be decoded to identify modulation and encoding information for a WLAN payload.

At block 1225, at least a portion of the WLAN signal may be reconstructed from the stored digital samples by demodulating and decoding at least a portion of the WLAN payload. The WLAN payload (or at least the portion thereof) may be demodulated and decoded based at least in part on the modulation and encoding information obtained from decoding the WLAN preamble. In some cases, reconstructing at least a portion of the WLAN signal may include identifying a duration of a cellular signal in the plurality of signals, and reconstructing at least the portion of the WLAN signal such that the reconstructed portion of the WLAN signal has the same duration as the duration of the cellular signal. In the same or other cases, reconstructing at least a portion of the WLAN signal may include identifying a bandwidth of a cellular signal in the plurality of signals, and reconstructing at least the portion of the WLAN signal such that the reconstructed portion of the WLAN signal has the same bandwidth as the bandwidth of the cellular signal. Also in the same or other cases, reconstructing at least a portion of the WLAN signal may include tracking a metric corresponding to an energy of the plurality of signals, and reconstructing at least the portion of the WLAN signal until the metric being tracked breaches a threshold value. Breach of the threshold may indicate that a need for reconstructing the WLAN signal no longer exists, because, for example, interference caused by the WLAN signal no longer exists or is within an acceptable limit.

The at least a portion of the WLAN signal may in some cases be reconstructed by a WLAN receiver that accesses the stored digital samples from the buffer. The WLAN receiver may be configured to perform the reconstructing of the at least a portion of the WLAN signal without being associated with an access point that transmitted the WLAN signal. Thus, for example, the WLAN receiver may reconstruct at least a portion of a WLAN signal that was not intended for the WLAN receiver.

The operation(s) at block 1215, 1220, and/or 1225 may in some cases be performed using the integrated receiver module 620, 710, 865, and/or 975 described with reference to FIGS. 6, 7A, 8, and/or 9, the WLAN receiver or WLAN receiver module 670, 735, and/or 750 described with reference to FIGS. 6, 7A, and/or 7B, and/or the module or function 1041 or 1081 described with reference to FIG. 10.

At block 1230, the reconstructed portion of the WLAN signal may be removed from the stored digital samples before the contents of the buffer are converted to the frequency domain for demodulation and decoding of the cellular signal by a cellular receiver (e.g., an LTE receiver). The operation(s) at block 1230 may in some cases be performed using the integrated receiver module 620, 710, 865, and/or 975 described with reference to FIGS. 6, 7A, 8, and/or 9, the cellular receiver or receiver module 660, 730, and/or 780 described with reference to FIGS. 6, 7A, and/or 7C, and/or the module or function 1041 or 1081 described with reference to FIG. 10.

Thus, the method 1200 may provide for wireless communications. It should be noted that the method 1200 is just one implementation and that the operations of the method 1200 may be rearranged or otherwise modified such that other implementations are possible.

Figure 13:
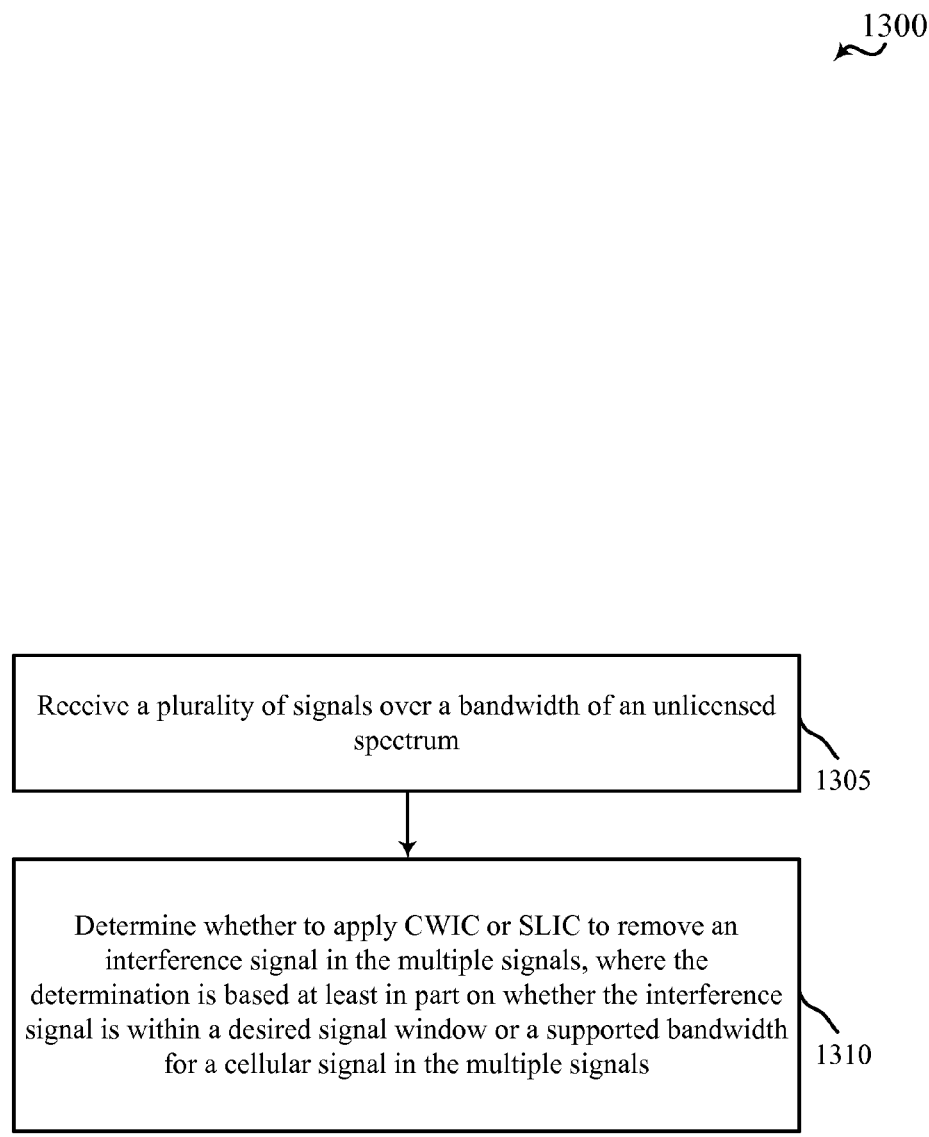
FIGS. 13 and 14 are flowcharts of example methods for wireless communications using an unlicensed radio frequency spectrum band (e.g., methods for determining what interference cancelation technique to apply at a receiver) according to various examples.

FIG. 13 is a flow chart illustrating an example of a method 1300 for wireless communications. For clarity, the method 1300 is described below with reference to one of the eNBs or devices 105, 205, 305, 705, 805, and/or 1005 described with reference to FIGS. 1, 2, 3, 7A, 8, and/or 10, or one of the UEs or devices 115, 215, 315, 705, 915, and/or 1015 described with reference to FIGS. 1, 2, 3, 7, 9, and/or 10, or one of the integrated receiver modules 620, 710, 865, and/or 975, described with reference to FIGS. 6, 7A, 8, and/or 9. In one example, an eNB, UE, or integrated receiver module may execute one or more sets of codes to control the functional elements of the eNB, UE, cellular receiver, and/or WLAN receiver to perform the functions described below.

At block 1305, a plurality of signals may be received over a bandwidth of an unlicensed radio frequency spectrum. The operation(s) at block 1305 may in some cases be performed using the integrated receiver module 620, 710, 865, and/or 975 described with reference to FIGS. 6, 7A, 8, and/or 9, the RF module 630 and A-to-D module 640 described with reference to FIG. 6, the RF front-end 715 described with reference to FIG. 7A, and/or the Rx demodulators 1032-*a* through 1032-*x* or 1054-*a* through 1054-*x* described with reference to FIG. 10.

At block 1310, it may be determined whether to apply CWIC or SLIC to remove an interference signal in the plurality of signals. The determination may be based at least in part on whether the interference signal is within a desired signal window or a supported bandwidth for a cellular signal in the plurality of signals. The interference signal may in some cases be a WLAN signal. The operation(s) at block 1310 may in some cases be performed using the integrated receiver module 620, 710, 865, and/or 975 described with reference to FIGS. 6, 7A, 8, and/or 9, the WLAN receiver or WLAN receiver module 670, 735, and/or 750 described with reference to FIGS. 6, 7A, and/or 7B, and/or the module or function 1041 or 1081 described with reference to FIG. 10.

Thus, the method 1300 may provide for wireless communications. It should be noted that the method 1300 is just one implementation and that the operations of the method 1300 may be rearranged or otherwise modified such that other implementations are possible.

Figure 14:
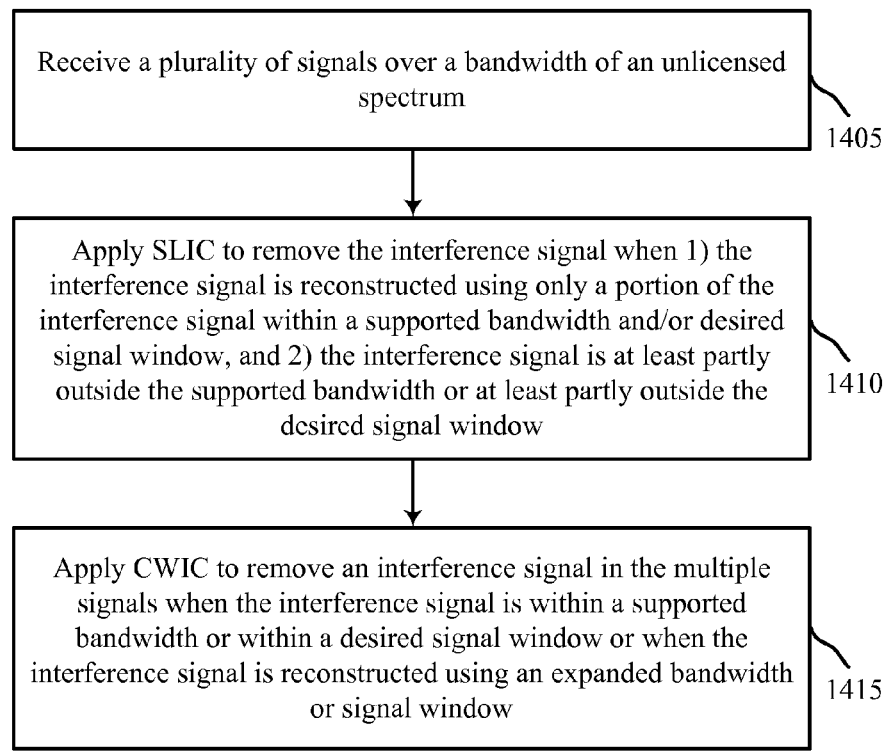

FIG. 14 is a flow chart illustrating an example of a method 1400 for wireless communications. For clarity, the method 1400 is described below with reference to one of the eNBs or devices 105, 205, 305, 705, 805, and/or 1005 described with reference to FIG. 1, 2, 3, 7A, 8, and/or 10, or one of the UEs or devices 115, 215, 315, 705, 915, and/or 1015 described with reference to FIGS. 1, 2, 3, 7, 9, and/or 10, or one of the integrated receiver modules 620, 710, 865, and/or 975, described with reference to FIGS. 6, 7A, 8, and/or 9. In one example, an eNB, UE, or integrated receiver module may execute one or more sets of codes to control the functional elements of the eNB, UE, cellular receiver, and/or WLAN receiver to perform the functions described below.

At block 1405, a plurality of signals may be received over a bandwidth of an unlicensed radio frequency spectrum. The operation(s) at block 1405 may in some cases be performed using the integrated receiver module 620, 710, 865, and/or 975 described with reference to FIGS. 6, 7A, 8, and/or 9, the RF module 630 and A-to-D module 640 described with reference to FIG. 6, the RF front-end 715 described with reference to FIG. 7A, and/or the Rx demodulators 1032-*a* through 1032-*x* or 1054-*a* through 1054-*x* described with reference to FIG. 10.

At block 1410 and block 1415, it may be determined whether to apply CWIC or SLIC to remove an interference signal in the plurality of signals. The determination may be based at least in part on whether the interference signal is within a desired signal window or a supported bandwidth for a cellular signal in the plurality of signals. The interference signal may in some cases be a WLAN signal.

When a portion of the interference signal within the desired signal and/or the supported bandwidth is reconstructed, and when a determination is made at block 1410 that the interference signal is at least partly outside the desired signal window and/or at least partly outside the supported bandwidth, SLIC may be applied to remove the interference signal. When a portion of the interference signal within the desired signal and/or the supported bandwidth is reconstructed, and when a determination is made at block 1415 that the interference signal is within the desired signal window or within the desired bandwidth, CWIC may be applied to remove the interference signal (though SLIC, albeit less robust, could also be applied). When a determination is made that the interference signal is outside the supported bandwidth and/or outside the desired signal window at block 1415, and when the interference signal is reconstructed using an expanded bandwidth or expanded signal window (i.e., a bandwidth or signal window that includes the frequency or time extent of the interference signal), CWIC may be applied to remove the interference signal (though SLIC may also be applied).

The operation(s) at block 1410 and/or block 1415 may in some cases be performed using the integrated receiver module 620, 710, 865, and/or 975 described with reference to FIGS. 6, 7A, 8, and/or 9, the WLAN receiver or WLAN receiver module 670, 735, and/or 750 described with reference to FIGS. 6, 7A, and/or 7B, and/or the module or function 1041 or 1081 described with reference to FIG. 10.

Thus, the method 1400 may provide for wireless communications. It should be noted that the method 1400 is just one implementation and that the operations of the method 1400 may be rearranged or otherwise modified such that other implementations are possible.

Figure 15:
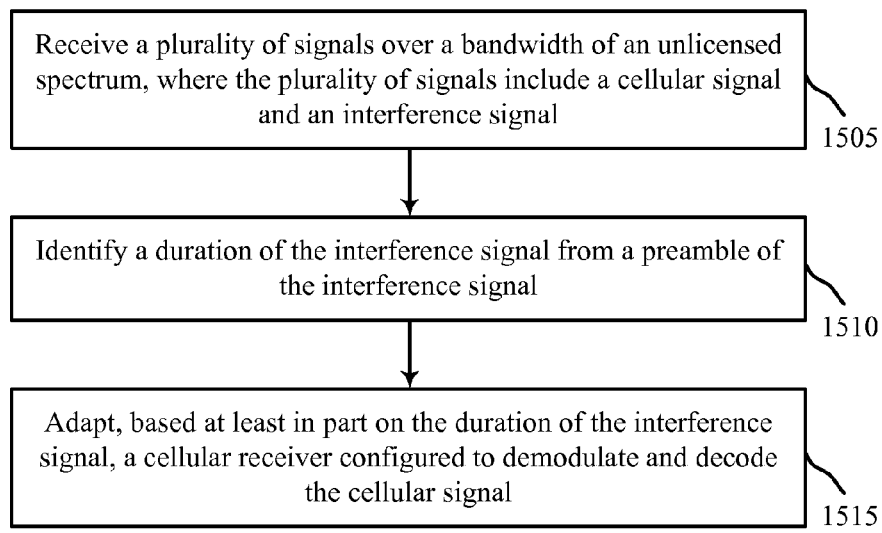
FIGS. 15 and 16 are flowcharts of example methods for wireless communications using an unlicensed radio frequency spectrum band (e.g., methods in which a cellular receiver may be adapted) according to various examples.

FIG. 15 is a flow chart illustrating an example of a method 1500 for wireless communications. For clarity, the method 1500 is described below with reference to one of the eNBs or devices 105, 205, 305, 705, 805, and/or 1005 described with reference to FIGS. 1, 2, 3, 7A, 8, and/or 10, or one of the UEs or devices 115, 215, 315, 705, 915, and/or 1015 described with reference to FIGS. 1, 2, 3, 7, 9, and/or 10, or one of the integrated receiver modules 620, 710, 865, and/or 975, described with reference to FIGS. 6, 7A, 8, and/or 9. In one example, an eNB, UE, or integrated receiver module may execute one or more sets of codes to control the functional elements of the eNB, UE, cellular receiver, and/or WLAN receiver to perform the functions described below.

At block 1505, a plurality of signals including at least a cellular signal and an interference signal may be received over a bandwidth of an unlicensed radio frequency spectrum. The interference signal may in some cases be a WLAN signal. The operation(s) at block 1505 may in some cases be performed using the integrated receiver module 620, 710, 865, and/or 975 described with reference to FIGS. 6, 7A, 8, and/or 9, the RF module 630 and A-to-D module 640 described with reference to FIG. 6, the RF front-end 715 described with reference to FIG. 7A, and/or the Rx demodulators 1032-$a$ through 1032-$x$ or 1054-$a$ through 1054-$x$ described with reference to FIG. 10.

At block 1510, a duration of the interference signal may be identified from a preamble of the interference signal. The operation(s) at block 1510 may in some cases be performed using the integrated receiver module 620, 710, 865, and/or 975 described with reference to FIGS. 6, 7A, 8, and/or 9, the WLAN receiver or WLAN receiver module 670, 735, and/or 750 described with reference to FIGS. 6, 7A, and/or 7B, and/or the module or function 1041 or 1081 described with reference to FIG. 10.

At block 1515, and based at least in part on the duration of the interference signal, a cellular receiver configured to demodulate and decode the cellular signal (e.g., an LTE receiver) may be adapted. The operation(s) at block 1515 may in some cases be performed using the integrated receiver module 620, 710, 865, and/or 975 described with reference to FIGS. 6, 7A, 8, and/or 9, the WLAN receiver or WLAN receiver module 670, 735, and/or 750 described with reference to FIGS. 6, 7A, and/or 7B, and/or the module or function 1041 or 1081 described with reference to FIG. 10.

Thus, the method 1500 may provide for wireless communications. It should be noted that the method 1500 is just one implementation and that the operations of the method 1500 may be rearranged or otherwise modified such that other implementations are possible.

Figure 16:
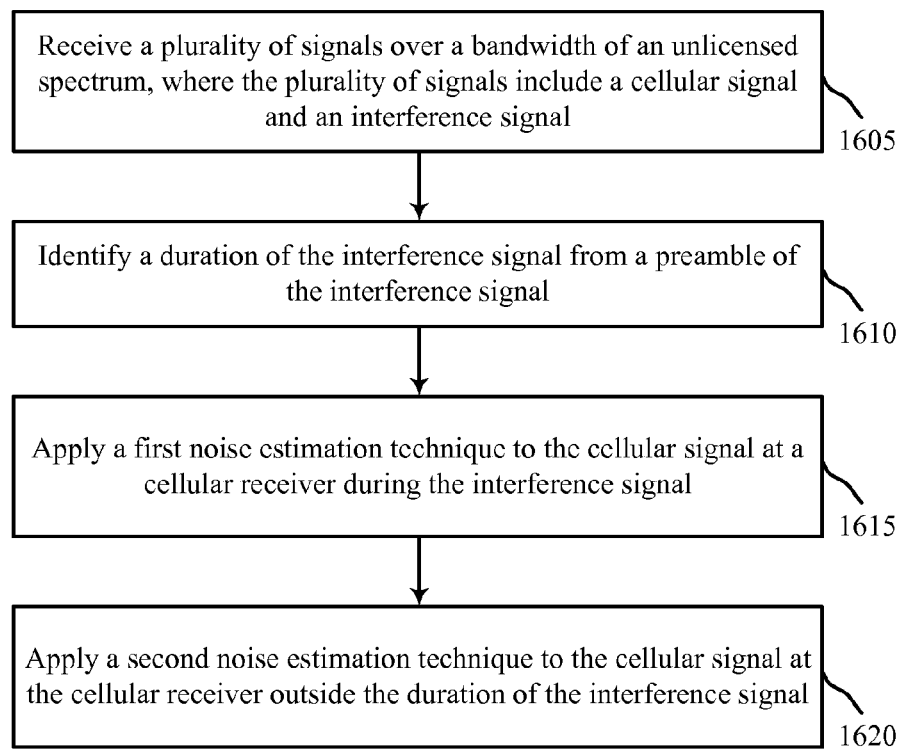

FIG. 16 is a flow chart illustrating an example of a method 1600 for wireless communications. For clarity, the method 1600 is described below with reference to one of the eNBs or devices 105, 205, 305, 705, 805, and/or 1005 described with reference to FIGS. 1, 2, 3, 7A, 8, and/or 10, or one of the UEs or devices 115, 215, 315, 705, 915, and/or 1015 described with reference to FIGS. 1, 2, 3, 7, 9, and/or 10, or one of the integrated receiver modules 620, 710, 865, and/or 975, described with reference to FIGS. 6, 7A, 8, and/or 9. In one example, an eNB, UE, or integrated receiver module may execute one or more sets of codes to control the functional elements of the eNB, UE, cellular receiver, and/or WLAN receiver to perform the functions described below.

At block 1605, a plurality of signals including at least a cellular signal and an interference signal may be received over a bandwidth of an unlicensed radio frequency spectrum. The interference signal may in some cases be a WLAN signal. The operation(s) at block 1605 may in some cases be performed using the integrated receiver module 620, 710, 865, and/or 975 described with reference to FIGS. 6, 7A, 8, and/or 9, the RF module 630 and A-to-D module 640 described with reference to FIG. 6, the RF front-end 715 described with reference to FIG. 7A, and/or the Rx demodulators 1032-$a$ through 1032-$x$ or 1054-$a$ through 1054-$x$ described with reference to FIG. 10.

At block 1610, a duration of the interference signal may be identified from a preamble of the interference signal. The operation(s) at block 1610 may in some cases be performed using the integrated receiver module 620, 710, 865, and/or 975 described with reference to FIGS. 6, 7A, 8, and/or 9, the WLAN receiver or WLAN receiver module 670, 735, and/or 750 described with reference to FIGS. 6, 7A, and/or 7B, and/or the module or function 1041 or 1081 described with reference to FIG. 10.

At block 1615 and block 1620, and based at least in part on the duration of the interference signal, a cellular receiver configured to demodulate and decode the cellular signal (e.g., an LTE receiver) may be adapted. In some cases, the adaption may include applying a first noise estimation technique or resolution to the cellular signal during the interference signal (at block 1615), and applying a second noise estimation technique or resolution to the cellular signal outside the duration of the interference signal (at block 1620).

In other cases, adaption of the cellular receiver may include 1) identifying code blocks in the cellular signal that occur during the interference signal, and 2) decoding the identified code blocks before decoding any remaining code blocks in the cellular signal that occur outside the duration of the interference signal. In still other cases, adaptation of the cellular receiver may include removing, from a CSI report, information about the interference signal. The information may be removed, for example, when the duration of the interference signal is less than a threshold value. In some cases, two or more cellular receiver adaptations may be combined.

The operation(s) at block 1615 and/or 1620 may in some cases be performed using the integrated receiver module 620, 710, 865, and/or 975 described with reference to FIGS. 6, 7A, 8, and/or 9, the WLAN receiver or WLAN receiver module 670, 735, and/or 750 described with reference to FIGS. 6, 7A, and/or 7B, and/or the module or function 1041 or 1081 described with reference to FIG. 10.

Thus, the method 1600 may provide for wireless communications. It should be noted that the method 1600 is just one implementation and that the operations of the method 1600 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications, comprising:
   receiving, by a cellular receiver of a wireless device, a plurality of modulated signals comprising at least a wireless local area network (WLAN) signal and a cellular signal over a bandwidth of an unlicensed radio frequency spectrum;
   storing digital samples of the plurality of signals in a buffer of the wireless device;
   reconstructing, by a WLAN receiver of the wireless device, at least a portion of the WLAN signal from the stored digital samples, the reconstructing comprising detecting a WLAN preamble from the stored digital samples, decoding the WLAN preamble to identify modulation and encoding information for a WLAN payload, and demodulating and decoding at least a portion of the WLAN payload based at least in part on the modulation and encoding information; and
   removing the reconstructed portion of the WLAN signal from the stored digital samples before contents of the buffer are converted to a frequency domain for demodulation and decoding of the cellular signal by the cellular receiver.

2. The method of claim 1, wherein reconstructing at least a portion of the WLAN signal comprises:
   identifying a duration of the cellular signal in the plurality of signals; and
   reconstructing at least a portion of the WLAN signal wherein the reconstructed portion of the WLAN signal has a same duration as the duration of the cellular signal.

3. The method of claim 1, wherein reconstructing at least a portion of the WLAN signal comprises:
   identifying a bandwidth of the cellular signal in the plurality of signals; and
   reconstructing at least a portion of the WLAN signal wherein the reconstructed portion of the WLAN signal has the same bandwidth as the bandwidth of the cellular signal.

4. The method of claim 1, wherein reconstructing at least a portion of the WLAN signal comprises:
   tracking a metric corresponding to an energy of the plurality of signals; and reconstructing at least a portion of the WLAN signal until the metric being tracked breaches a threshold value.

5. The method of claim 1, further comprising accessing, by the WLAN receiver, the stored digital samples from the buffer to perform the reconstructing of at least a portion of the WLAN signal.

6. The method of claim 5, wherein the WLAN receiver is configured to perform the reconstructing of at least a portion of the WLAN signal without being associated with an access point that transmitted the WLAN signal.

7. The method of claim 1, wherein the method is performed by one of the group consisting of an evolved Node B (eNB) and a UE.

8. The method of claim 1, wherein the cellular receiver comprises a Long Term Evolution (LTE) receiver.

9. An apparatus for wireless communications, comprising:
   a processor; and
   memory coupled to the processor, wherein the processor is configured to:
   receive, by a cellular receiver of a wireless device, a plurality of modulated signals comprising at least a wireless local area network (WLAN) signal and a cellular signal over a bandwidth of an unlicensed radio frequency spectrum;
   store digital samples of the plurality of signals in a buffer of the wireless device;
   reconstruct, by a WLAN receiver of the wireless device, at least a portion of the WLAN signal from the stored digital samples, the reconstructing comprising detecting a WLAN preamble from the stored digital samples, decoding the WLAN preamble to identify modulation and encoding information for a WLAN payload, and demodulating and decoding at least a portion of the WLAN payload based at least in part on the modulation and encoding information; and
   remove the reconstructed portion of the WLAN signal from the stored digital samples before contents of the buffer are converted to a frequency domain for demodulation and decoding of the cellular signal by the cellular receiver.

10. The apparatus of claim 9, wherein the processor is configured to reconstruct at least a portion of the WLAN signal by:
   identifying a duration of the cellular signal in the plurality of signals; and
   reconstructing at least a portion of the WLAN signal wherein the reconstructed portion of the WLAN signal has a same duration as the duration of the cellular signal.

11. The apparatus of claim 9, wherein the processor is configured to reconstruct at least a portion of the WLAN signal by:
   identifying a bandwidth of the cellular signal in the plurality of signals; and
   reconstructing at least a portion of the WLAN signal wherein the reconstructed portion of the WLAN signal has the same bandwidth as the bandwidth of the cellular signal.

12. The apparatus of claim 9, wherein the processor is configured to reconstruct at least a portion of the WLAN signal by:
   tracking a metric corresponding to an energy of the plurality of signals; and
   reconstructing at least a portion of the WLAN signal until the metric being tracked breaches a threshold value.

13. The apparatus of claim 9, wherein the processor is configured to cause a WLAN receiver to access the stored digital samples from the buffer to perform the reconstructing of at least a portion of the WLAN signal.

14. The apparatus of claim 13, wherein the WLAN receiver is configured to perform the reconstructing of at least a portion of the WLAN signal without being associated with an access point that transmitted the WLAN signal.

15. A non-transitory computer-readable medium storing code for wireless communications, the code comprising instructions executable by a processor to:
   receive, by a cellular receiver of a wireless device, a plurality of modulated signals comprising at least a wireless local area network (WLAN) signal and a cellular signal over a bandwidth of an unlicensed radio frequency spectrum;
   store digital samples of the plurality of signals in a buffer of the wireless device;
   reconstruct, by a WLAN receiver of the wireless device, at least a portion of the WLAN signal from the stored digital samples, the reconstructing comprising detecting a WLAN preamble from the stored digital samples, decoding the WLAN preamble to identify modulation and encoding information for a WLAN payload, and demodulating and decoding at least a portion of the WLAN payload based at least in part on the modulation and encoding information; and
   remove the reconstructed portion of the WLAN signal from the stored digital samples before contents of the buffer are converted to a frequency domain for demodulation and decoding of the cellular signal by the cellular receiver.

16. The non-transitory computer-readable medium of claim 15, wherein the instructions executable by the processor to reconstruct at least a portion of the WLAN signal comprise instructions executable by the processor to:
   identify a duration of the cellular signal in the plurality of signals; and
   reconstruct at least a portion of the WLAN signal wherein the reconstructed portion of the WLAN signal has a same duration as the duration of the cellular signal.

17. The non-transitory computer-readable medium of claim 15, wherein the instructions executable by the processor to reconstruct at least a portion of the WLAN signal comprise instructions executable by the processor to:
   identify a bandwidth of the cellular signal in the plurality of signals; and
   reconstruct at least a portion of the WLAN signal wherein the reconstructed portion of the WLAN signal has the same bandwidth as the bandwidth of the cellular signal.

18. The non-transitory computer-readable medium of claim 15, wherein the instructions executable by the processor to reconstruct at least a portion of the WLAN signal comprise instructions executable by the processor to:
   track a metric corresponding to an energy of the plurality of signals; and
   reconstruct at least a portion of the WLAN signal until the metric being tracked breaches a threshold value.

19. The non-transitory computer-readable medium of claim 15, further comprising instructions executable by the processor to:
   access, by the WLAN receiver, the stored digital samples from the buffer to perform the reconstructing of at least a portion of the WLAN signal.

20. The non-transitory computer-readable medium of claim 19, wherein the WLAN receiver is configured to perform the reconstructing of at least a portion of the WLAN signal without being associated with an access point that transmitted the WLAN signal.

21. The non-transitory computer-readable medium of claim 15, wherein the non-transitory computer-readable medium is one of the group consisting of an evolved Node B (eNB) and a UE.

22. The non-transitory computer-readable medium of claim 15, wherein the cellular receiver comprises a Long Term Evolution (LTE) receiver.

* * * * *